United States Patent
Lin et al.

(10) Patent No.: US 10,356,725 B2
(45) Date of Patent: Jul. 16, 2019

(54) UPLINK SIGNAL SENDING METHOD AND USER EQUIPMENT

(71) Applicant: ZTE CORPORATION, Shenzhen, Guangdong Province (CN)

(72) Inventors: Zhirong Lin, Shenzhen (CN); Bo Dai, Shenzhen (CN); Lu Ren, Shenzhen (CN); Shuqiang Xia, Shenzhen (CN)

(73) Assignee: ZTE CORPORATION (CN)

( * ) Notice: Subject to any disclaimer, the term of this patent is extended or adjusted under 35 U.S.C. 154(b) by 68 days.

(21) Appl. No.: 15/856,017

(22) Filed: Dec. 27, 2017

(65) Prior Publication Data

US 2018/0124712 A1 May 3, 2018

Related U.S. Application Data

(63) Continuation of application No. 14/372,993, filed as application No. PCT/CN2012/085724 on Dec. 3, 2012, now abandoned.

(30) Foreign Application Priority Data

Jan. 20, 2012 (CN) .......................... 2012 1 0018906
Jan. 21, 2012 (CN) .......................... 2012 1 0019827

(51) Int. Cl.
*H04W 52/14* (2009.01)
*H04L 5/00* (2006.01)
(Continued)

(52) U.S. Cl.
CPC .......... *H04W 52/146* (2013.01); *H04L 5/001* (2013.01); *H04W 52/0209* (2013.01);
(Continued)

(58) Field of Classification Search
None
See application file for complete search history.

(56) References Cited

U.S. PATENT DOCUMENTS

| 2011/0007674 A1* | 1/2011 | Dai ...................... H04L 1/1812 370/282 |
| 2011/0128942 A1* | 6/2011 | Kim ..................... H04B 7/0632 370/336 |
| 2011/0280169 A1* | 11/2011 | Seo ..................... H04W 52/346 370/311 |

(Continued)

FOREIGN PATENT DOCUMENTS

| CN | 101552991 A | 10/2009 |
| CN | 101888648 A | 11/2010 |

(Continued)

OTHER PUBLICATIONS

Views on UL control enhancements for CA; Ericsson, ST-Ericsson; 3GPP TSG-RAN WG1 #67 San Francisco, Nov. 14-18, 2011; R1-113671.

(Continued)

*Primary Examiner* — Chi H Pham
*Assistant Examiner* — Vladislav Y Agureyev
(74) *Attorney, Agent, or Firm* — McDonald Hopkins LLC

(57) ABSTRACT

An uplink signal transmitting method applied to a carrier aggregation system, comprises: after configuring more than two timing advances, user equipment rate-matching uplink signals and/or uplink channels between which front-to-back symbol overlap will occur in time domain over different uplink carriers, and then transmitting the uplink signals and/or uplink channels, or discarding and then transmitting the uplink signals and/or uplink channels, or transmitting simultaneously.

20 Claims, 6 Drawing Sheets

(51) Int. Cl.
*H04W 56/00* (2009.01)
*H04W 72/04* (2009.01)
*H04W 52/02* (2009.01)

(52) U.S. Cl.
CPC ... *H04W 56/0005* (2013.01); *H04W 56/0045* (2013.01); *H04W 72/0453* (2013.01); *H04L 5/0053* (2013.01); *Y02D 70/00* (2018.01); *Y02D 70/1262* (2018.01); *Y02D 70/1264* (2018.01)

(56) References Cited

U.S. PATENT DOCUMENTS

| | | | | |
|---|---|---|---|---|
| 2013/0114505 A1* | 5/2013 | Haim | .................. | H04W 52/146 370/328 |
| 2013/0279433 A1* | 10/2013 | Dinan | .................. | H04W 52/146 370/329 |
| 2013/0324182 A1* | 12/2013 | Deng | .................... | H04W 92/18 455/522 |

FOREIGN PATENT DOCUMENTS

| | | |
|---|---|---|
| CN | 102118801 A | 7/2011 |
| CN | 102118873 A | 7/2011 |
| CN | 102215503 A | 10/2011 |
| CN | 102301800 A | 12/2011 |
| CN | 102378341 A | 3/2012 |
| CN | 102572967 A | 7/2012 |

OTHER PUBLICATIONS

Simultaneous transmission of multiple uplink channels in LTE-A Rel-11; CATT; 3GPP TSG RAN WG1 Meeting#67 San Francisco, USA, Nov. 14-18, 2011; R1-113721.

Issues of PRACH transmission on SCell; ZTE; 3GPP TSG RAN WG1 Meeting#67 San Francisco, USA, Nov. 14-18, 2011;R1-113761.

Uplink signaling for carrier aggregation enhancement; Panasonic; 3GPP TSG RAN WG1 Meeting#67 San Francisco, USA, Nov. 14-18, 2011; R1-113802.

Aspect on Simultaneous Transmission of PRACH and UL Channels considering Multiple Timing Advance; LG Electronics; 3GPP TSG RAN WG1 Meeting#67 San Francisco, USA, 14thR1-113910.

Issues on UL Simultaneous Transmission for Multiple TA; NTT DOCOMO; 3GPP TSG RAN WG1 Meeting#67 San Francisco, USA, Nov. 14-18, 2011; R1-114070.

* cited by examiner

UPLINK SIGNAL SENDING METHOD AND USER EQUIPMENT

RELATED APPLICATION

This is a continuation of the application Ser. No. 14/372,993, filed on Jul. 17, 2014, which is a national stage application under 35 U.S.C. 154(d)(4) and 35 U.S.C. 371 for PCT/CN2012/085724, filed on Dec. 3, 2012 and claimed priority under 35 U.S.C. 119(a) and 35 U.S.C. 365(b) to Chinese Patent Application No. CN201210018906.7, filed on Jan. 20, 2012 and Chinese Patent Application No. CN201210019827.8, filed on Jan. 21, 2012.

TECHNICAL FIELD

The present document relates to the field of digital communication, and more particularly, to 3GPP Long Term Evolution and 3GPP Long Term Evolution Advanced (referred to as LTE-A), and more particularly, to an uplink signal transmitting method and user equipment thereof.

BACKGROUND

Uplink physical channels in the Long Term Evolution (referred to as LTE) system comprise: Physical Random Access Channel (referred to as PARCH), Physical Uplink Shared Channel (referred to as PUSCH), and Physical Uplink Control Channel (referred to as PUCCH). Single-carrier OFDM (Orthogonal Frequency Division Multiplexing) technique is used in the LTE uplink, and the reference signal and data are multiplexed together in the manner of TDM (Time Division Multiplexing). The uplink reference signal comprises demodulation reference signal (referred to as DMRS) and Sounding Reference Signal (referred to as SRS), wherein, said DMRS comprises PUCCH demodulation reference signal and PUSCH demodulation reference signal, which are respectively used for different channel transmission. The main role of the DMRS is for estimation of uplink channels and coherent detection and demodulation of the evolved NodeB (referred to as eNB), and the main role of the SRS is for measurement of uplink channels, whereby, the eNB can perform frequency selective scheduling.

In the LTE (Long Term Evolution) system, in order to achieve and maintain the uplink synchronization between user equipment (referred to as UE) and the evolved NodeB, the evolved NodeB sends Timing Advance (referred to as TA) to each user equipment according to the transmission delay between itself and said user equipment, the user equipment advances or retards its respective uplink transmission timing according to the timing advance sent by the evolved NodeB, so as to compensate for the transmission delay of the user terminal to the evolved NodeB, so that uplink signals of different user equipment can reach the evolved NodeB during the evolved NodeB's receiving window.

The LTE-A (LTE Advanced) system is the next generation of the LTE system, it introduces the concept of Carrier Aggregation. The LTE system bandwidth of said carrier aggregation can be regarded as component carrier frequency spectrum, and each component carrier may also be called a serving cell, that is, one frequency spectrum can be aggregated with a plurality of component carriers (serving cells). One R10 UE resource consists of a plurality of serving cells (component carrier) in the frequency domain, and one cell therein is called the Primary cell (referred to as PCell), and the remaining cells are called Secondary cells (referred to as SCells).

After the introduction of carrier aggregation technology, the user equipment can operate simultaneously on a plurality of component carriers which may be continuous or discontinuous in the frequency band and may also be within the same frequency band or come from different frequency bands. In the case that the component carriers are not continuous, or the component carriers come from different frequency bands, since each component carrier has different transmission characteristics, the timing advances of the component carriers may be different from each other; even if the component carriers belong to the same frequency band and are continuous in the frequency band, if each component carrier comes from different remote radio units (referred to as RRU), or in order to increase the cell coverage, each component carrier is processed respectively via different repeater, then the timing advance of each component carrier may be different. In the LTE system, the UE only operates on one carrier (which is one carrier in the time division duplex mode, and one pair of uplink and downlink carriers in the frequency division duplex mode, for convenience of description, these two cases are herein referred to as a carrier), and only needs to maintain the uplink synchronization of one uplink, while in the carrier aggregation, the UEs can work simultaneously on a plurality of component carriers, and the TAs of these component carriers may be different, that is, there are Multiple Timing Advances (referred to as MTA).

In the scenario of MTA, since the TAs of different uplink component carriers may be different, it means that the signal symbols sent on different uplink component carriers may not be aligned in the time domain, and there may be possibility that the signal symbols sent on different uplink component carriers may be overlapped in the time domain.

In the LTE system, if the transmission power of the signal symbols sent on different uplink component carriers exceeds the maximum transmission power configured by the UE, it needs to reduce the power of the uplink signals. Existing Rel-10 version of the LTE protocol only defines the power reduction method for the case that the uplink signals on multiple uplink carriers are in the same TA, that is, the uplink signal symbols on each uplink carrier are aligned in the time domain. This is specified as follows:

1. When the uplink channels on multiple uplink carriers configured by the UE comprise the PUCCH and the PUSCH, and said PUSCH does not carry the uplink control information (referred to as UCI), the UE does not reduce the transmission power of the PUCCH, but equal-ratio reduces the transmission power of all the PUSCHs, until the transmission power of the UE does not exceed the maximum transmission power configured by the UE.

2. When the uplink channels on multiple uplink carriers configured by the UE are PUSCHs, some of which carry the UCI, the UE does not reduce the transmission power of the PUSCHs carrying the UCI, but equal-ratio reduces the transmission power of all the PUSCHs not carrying the UCI, until the transmission power of the UE does not exceed the maximum transmission power configured by said UE.

3. When the uplink channels on a plurality of uplink carriers configured by the UE are PUSCHs, none of which carries the UCI, the UE equal-ratio reduces the transmission power of all the PUSCHs, until the transmission power of the UE does not exceed the maximum transmission power configured by the UE.

4. When the uplink channels on multiple uplink carriers configured by the UE comprise PUCCHs and PUSCHs, and some of PUSCHs carry the UCI, the UE does not reduce the power of the PUCCHs and the PUSCHs carrying UCI, while equal-ratio reduces the transmission power of the PUSCHs not carrying UCI, until the transmission power of the UE does not exceed the maximum transmission power configured by the UE.

5. When the uplink signals on multiple uplink carriers configured by the UE are SRS, the UE equal-ratio reduces the transmission power of all the SRSs, until the transmission power of the UE does not exceed the maximum transmission power configured by the UE.

Combined with the above description, in the scenario of MTA, if the transmission power of the overlapped symbols in the time domain exceeds the maximum transmission power configured by the UE, it needs to reduce the power of the uplink signals. But in the current Rel-10 and earlier versions of the LTE protocol, there is no definition of power reduction method for the case that, when the transmission symbols are overlapped in the time domain, the transmission power of the overlapped symbols exceeds the maximum transmission power configured by the UE. Therefore, to ensure the normal operation of the carrier aggregation system configured with MTA, it requires to define a power reduction method in the scenario of MTA, when the signal symbols sent on different uplink component carriers overlap in the time domain, and the transmission power of the overlapped symbols exceeds the maximum transmission power configured by the UE.

SUMMARY

The main objective of the present document is to provide an uplink signal sending method and a user equipment, to solve the problem of signal transmission in the case that the signal symbols sent on different uplink component carriers overlap in the time domain in the scenario of MTA.

To solve the abovementioned problem, the present document provides an uplink signal sending method which is applied to a carrier aggregation system, comprising:

after configuring more than two timing advances, a user equipment (UE) sending uplink channels and/or uplink signals in which symbols are to be overlapped in a time domain on different carriers after rate-matching processing on the uplink channels and/or uplink signals, or sending after discarding said uplink channels and/or uplink signals, or simultaneously sending said uplink channels and/or uplink signals according to a signaling instruction sent from an evolved NodeB (eNB) or predefined rules.

Accordingly, the present document also provides an user equipment to be used in a carrier aggregation system, comprising:

a receiving module, configured to receive more than two timing advances configured by an evolved NodeB;

a sending module, configured to send after performing rate matching for the uplink channels and/or uplink signals in which symbols are overlapped in the time domain on different carriers, or to send the uplink channels and/or uplink signals after discarding, or simultaneously sending said uplink channels and/or uplink signals.

An uplink signal power reduction method in a carrier aggregation system, an UE being configured with multiple timing advances, when symbols in uplink channels carried on different carriers are not aligned in the time domain and symbols on different carriers are overlapped in the time domain, if a sum of the transmission power of each uplink channel of said UE is determined to be bigger than a maximum transmission power configured for said UE, then an eNB instructing said UE to reduce a transmission power of said uplink channels in which symbols are overlapped in the time domain on different carriers.

An uplink signal power reduction method in a carrier aggregation system, an UE being configured with multiple timing advances, when symbols in uplink channels carried on different carriers are not aligned in the time domain and symbols on different carriers are overlapped in the time domain, if it is determined that a sum of transmission power of each uplink channel of said UE exceeds a maximum transmission power configured for said UE, then said UE reducing the transmission power of said uplink channels in which symbols are overlapped on different carriers in the time domain according to predefined rules.

An uplink signal power reduction apparatus in a carrier aggregation system, and said apparatus comprises a transmission power judgment unit and a power reduction instruction unit in said evolved NodeB, and a power reduction execution unit in said UE, wherein:

said transmission power judgment unit is configured to: when said user equipment is configured with multiple timing advances, and when it determines that the symbols in the uplink channels carried on different carriers are not aligned in the time domain, judge whether the symbols on different carriers are overlapped in the time domain or not, if yes, then judge whether the sum of the transmission power of each uplink channel of said UE exceeds the maximum transmission power configured for said UE or not;

said power reduction instruction unit is configured to: if said transmission power judgment unit determines that the sum of the transmission power of each uplink channel of said UE exceeds the maximum transmission power configured by said UE, instruct said UE to reduce the transmission power of said uplink channels in which symbols on different carriers are overlapped in the time domain;

said power reduction execution unit is configured to: according to an instruction from said evolved NodeB, reduce the transmission power of said uplink channels in which symbols are overlapped in the time domain on different carriers.

An uplink signal power reduction apparatus in a carrier aggregation system, and said apparatus comprises a transmission power judgment module and a transmission power reduction module in an UE, wherein:

said transmission power judgment module is configured to: said UE is configured with multiple timing advances, when symbols in the uplink channels carried on different carriers are not aligned in the time domain, and said symbols on different carriers are overlapped in the time domain, judge whether the sum of the transmission power of each uplink channel of the UE exceeds the maximum transmission power configured by said UE or not;

said transmission power reduction module is configured to: if said transmission power judgment module determines that the sum of the transmission power of each uplink channel of said UE exceeds the maximum transmission power configured by said UE, reduce the transmission power of said uplink channels in which symbols are to be overlapped in the time domain on different carriers according to said predefined rule.

PREFERRED EMBODIMENTS OF THE PRESENT DOCUMENT

Hereinafter, with combination of the accompanying drawings, the embodiments of the present document will be described in detail. It should be noted that, in the case of no conflict, the embodiments and features of the embodiments of the present application can be arbitrarily combined with each other.

Figure 1:
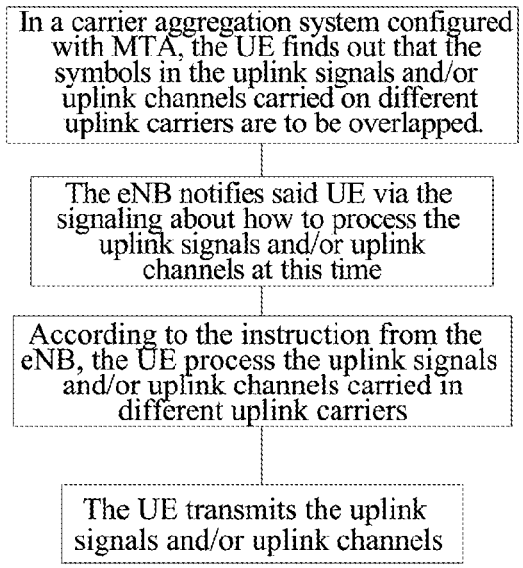
FIG. 1 shows a flow chart of an uplink signal sending method in accordance with an embodiment of the present document.
Figure 2:
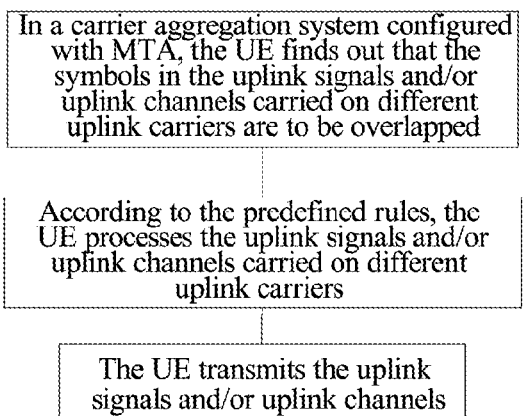
FIG. 2 shows a flow chart of another uplink signal sending method in accordance with an embodiment of the present document.

An uplink signal sending method applied in a carrier aggregation system, as shown in FIG. 1 and FIG. 2, comprises:

After configuring more than two TAs, said UE performs rate matching for uplink channels and/or uplink signals in which symbols are overlapped in the time domain on different carriers according to the signaling instruction from the eNB or the predefined rules, and then transmitting said uplink channels and/or uplink signals, or firstly discarding and then transmitting said uplink channels and/or uplink signals, or transmitting said uplink channels and/or uplink signals simultaneously. Wherein, said uplink channels can be PUSCH, PUCCH and/or PRACH; and the abovementioned uplink signal may be SRS, and said SRS may be periodic SRS or aperiodic SRS.

In a specific implementation, the abovementioned signaling instruction from said eNB can be physical signaling, or may be high-level signaling instruction, and the signaling content can be a triggering instruction and/or transmission instruction.

When said signaling content is a transmission instruction, said transmission instruction may instruct that uplink channels and/or uplink signals in which symbols are to be overlapped in the time domain on different carriers are allowed to send simultaneously, or may also instruct said UE to perform rate matching for said uplink channels and/or uplink signals in which symbols are to be overlapped in the time domain on different carriers according to certain rules (for specific rules, please refer to the following description of sending rule, and they will not be repeated here), and then send the uplink channels and/or uplink signals, or to discard and then send, or to simultaneously send said uplink channels and/or uplink signals.

Wherein, said simultaneous transmission is specifically: directly sending said uplink channels and/or uplink signals with non processing on the uplink channels and/or uplink signals in which symbols are to be overlapped in the time domain; said rate matching is specifically: perform Rate Matching (referred to as RM) for said uplink channels and/or uplink signals in which symbols are to be overlapped in the time domain, empty one particular symbol in said uplink channel and do not send within said symbol; said discarding is particularly: discard the specific uplink channels and/or uplink signals in which symbols are to be overlapped in the time domain, and not send the discarded uplink channels and/or uplink signals.

Furthermore, the abovementioned predefined rules are triggering rules and sending rules respectively, and only the triggering rule is met will the sending rules be processed;

wherein, the triggering rules in the predefined rules are at least one of the following rules:

1) the difference of said TA values of different uplink carriers configured by said eNB for said UE exceeds a first preset threshold value;

2) said UE finds out that the difference of the actual sending time of the configured different uplink carriers exceeds a second preset threshold value.

said sending rules in said predefined rules are at least one of the following rules:

1) when said uplink channels in which symbols are to be overlapped in the time domain on different carriers are PUSCHs, said UE may select any one of the following methods to process:

a) said UE simultaneously sends the PUSCHs on different carriers;

b) said UE discards the PUSCHs with lower priority according to certain priorities, and sends the PUSCH with higher priority. In the case that the PUSCHs with the same priority having symbols to be overlapped in the time domain, said UE simultaneously sends the PUSCHs with the same priority;

c) according to said priority rule, said UE performs rate matching for the PUSCHs with lower priority, and empties the symbols in the PUSCHs with lower priority that will be overlapped with the symbols in the PUSCHs with higher priority, and then sends the PUSCHs on different carriers. When the symbols in the PUSCHs with the same priority are to be overlapped in the time domain, said UE simultaneously sends the PUSCHs with the same priority.

It should be noted that, the priorities in the rule 1) are at least one of the following priorities:

I) priorities determined according to whether the uplink control information (referred to as UCI) is carried or not, wherein: the priority of the PUSCHs carrying UCI is higher than that of the PUSCHs not carrying UCI;

II) determine the priorities in accordance to the carriers carrying the PUSCH, wherein, the priority of the PUSCHs in the PCell is higher than that of the PUSCHs in the SCell;

III) determine the priorities according to the subframe indexes, wherein: the priority of the PUSCHs in a former sub-frame is higher than that of the PUSCHs in a latter sub-frame;

IV) determine the priorities according to the subframe indexes, wherein: the priority of the PUSCHs in the latter subframe is higher than that of the PUSCHs in the former subframe;

V) determine the priorities in accordance with whether there is newly sent data or not, wherein: the priority of the PUSCHs with newly sent data is higher than that of the PUSCHs carrying the resent data.

2) When said uplink channels in which symbols are to be overlapped in the time domain on different carriers are PUSCHs and PUCCHs, said UE may select any of the following methods to process:

a) said UE simultaneously sends the PUSCHs and PUCCHs on different carriers;

b) said UE discards the PUSCHs and only sends the PUCCHs;

c) said UE performs rate matching for said PUSCHs, and empties the symbols in the PUSCHs that are to be overlapped with the symbols in the PUCCHs, and sends the PUCCHs and PUSCHs on different carriers.

When said symbols in the PUSCHs and the PUCCHs on different carriers are overlapped in the time domain, after said UE performs the same operation on all the PUSCHs overlapped with the PUCCHs according to the method c), if there are symbols overlapped in the time domain in the PUSCHs, process the PUSCHs in which the symbols are overlapped in the time domain on different carriers.

3) When the uplink channels in which symbols are overlapped in the time domain on different carriers are PUSCHs and SRSs, said UE can select any of the following methods to process:

a) said UE simultaneously sends the SRSs and PUSCHs on different carriers;

b) said UE discards said SRSs, and only sends the PUSCHs;

c) said UE discards the PUSCHs, and only send the SRSs;

d) said UE performs rate matching on said PUSCHs, empties the symbols in said PUSCHs that are overlapped with said SRSs, and then sends said PUSCHs and SRSs on different carriers.

When the PUSCHs on multiple different carriers and the SRSs on multiple different carriers have symbols to be overlapped in the time domain, said UE processes all the overlapped PUSCHs and SRSs according to the method c), and if there is still the case that the symbols in the PUSCHs are overlapped in the time domain, in accordance with the rule 1), processes the PUSCHs in which symbols are overlapped in the time domain on different carriers.

4) when the uplink channels in which the symbols are overlapped in the time domain on different carriers are PUCCHs and SRSs, said UE can select any of the following methods to process:

a) said UE simultaneously sends the PUCCHs and the SRSs on different carriers;

b) said UE discards said SRSs, and only sends said PUCCHs;

5) When the symbols in the PUCCHs and SRSs are overlapped in the time domain on multiple different carriers, said UE can select any one of the following methods to process:

a) said UE simultaneously sends the PUCCHs and SRSs on multiple different carriers;

b) said UE discards all SRSs and only sends the PUCCHs;

c) said UE discards all the periodic SRS in which symbols are overlapped, and simultaneously sends all the aperiodic SRSs and PUCCHs in which symbols are overlapped.

Figure 11:
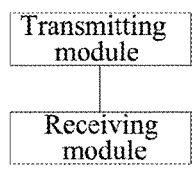
FIG. 11 is a schematic diagram of an user equipment in accordance with an embodiment of the present document.

In the present embodiment, an user equipment, as shown in FIG. 11, is applied to the carrier aggregation system, comprising:

a receiving module, used to receive more than two timing advances configured by the evolved NodeB;

a sending module, used to send after performing rate matching for the uplink channels and/or uplink signals in which symbols are overlapped in the time domain on different carriers, or to send the uplink channels and/or uplink signals after discarding, or simultaneously sending said uplink channels and/or uplink signals according to signaling instruction or predetermined rules sent from the NodeB.

Preferably, said signaling instruction is a sending instruction, said transmission instruction is used to instruct said UE to simultaneously send said uplink channels and/or uplink signals in which the symbols are overlapped in the time domain on different carriers, or, to instruct said UE to perform rate-matching said uplink channels and/or uplink signals in which symbols are to be overlapped in the time domain on different carriers according to a certain rule, and then send the said uplink channels and/or uplink signals, discard and then send said uplink channels and/or uplink signals, or simultaneously send said uplink channels and/or uplink signals.

Preferably, said sending module performs rate matching for said uplink channels and/or uplink signals in which symbols are to be overlapped in the time domain on different carriers, specifically comprising:

said sending module empties a particular symbol in the uplink channels for the uplink channels and/or uplink signals in which symbols are to be overlapped in the time domain, and does not send in said symbol.

Preferably, said sending module discards said uplink channels and/or uplink signals in which symbols are overlapped in the time domain on different carriers, specifically comprising:

said sending module discards the uplink channels and/or uplink signals in which the specific symbols are to be overlapped in the time domain, and does not send the corresponding uplink channel and/or uplink signal on the discarded symbols.

Preferably, said predefined rules comprise triggering rules and sending rules, and only said triggering rules are met will the uplink channels and/or uplink signals be processed according to said sending rules;

said triggering rules are at least one of the following rules:

the difference of the TA values of different uplink carriers configured by the eNB for the UE exceeds a first preset threshold value; or said UE finds out that the difference of the actual sending time of the configured different uplink carriers exceeds a second preset threshold value.

Preferably, said sending rules comprise:

when said uplink channels in which symbols are to be overlapped in the time domain on different carriers are PUSCHs, said sending module selects any one of the following methods to process:

method one: said sending module simultaneously sends the PUSCHs on different carriers;

method two: according to certain priorities, said sending module discards the PUSCHs with lower priority and sends the PUSCHs with higher priority. In the case that the PUSCHs with the same priority have symbols to be overlapped in the time domain, said sending module simultaneously sends the PUSCHs with the same priority;

method three: according to the priority rule, said sending module empties the symbols in the PUSCHs with lower priority that are to be overlapped with the symbols in the PUSCHs with higher priority, and then sends the PUSCHs on different carriers. When the symbols in the PUSCHs with the same priority are to be overlapped in the time domain, said sending module simultaneously sends said PUSCHs with the same priority.

Preferably, when determining the priorities according to whether the uplink control information (referred to as UCI) is carried or not, the priority of the PUSCHs carrying UCI is higher than that of the PUSCHs not carrying UCI;

when determining the priorities according to the carriers carrying the PUSCHs, the priority of the PUSCHs in the PCell is higher than that of the PUSCHs in the SCell;

when determining the priorities according to the subframe indexes, the priority of the PUSCHs in the former subframe is higher than that of the PUSCHs in the latter subframe;

when determining the priorities according to the subframe indexes, the priority of the PUSCHs in the latter subframe is higher than that of the PUSCHs in the former subframe;

when determining the priorities in accordance with whether there is newly sent data or not, the priority of the PUSCHs with newly sent data is higher than that of the PUSCHs carrying resent data.

Preferably, said sending rules comprise:

when the uplink channels in which symbols are to be overlapped in the time domain on different carriers are PUSCHs and PUCCHs, said sending module may select any of the following methods to process:

method one: said sending module simultaneously sends the PUSCHs and PUCCHs on different carriers;

method two: said sending module discards the PUSCHs and only sends the PUCCHs;

method three: said sending module performs rate matching, and empties the symbols in the PUSCHs that are to be overlapped with the symbols in the PUCCHs, and sends the PUCCHs and PUSCHs on different carriers.

Preferably, when the symbols in the PUSCHs and the PUCCHs on different carriers are overlapped in the time domain, after processing all said PUSCHs overlapped with said PUCCHs according to the method three, if there are still symbols in the PUSCHs to be overlapped in the time domain, select any of the following methods to process said more than two PUSCHs:

method one: said sending module simultaneously sends the PUSCHs on different carriers;

method two: according to certain priorities, said sending module discards the PUSCHs with lower priority, and sends the PUSCHs with higher priority; when the symbols in the PUSCHs with the same priority are to be overlapped in the time domain, said sending module simultaneously sends the PUSCHs with same priority;

method three: according to certain priorities, said sending module empties the symbols in the PUSCHs with lower priority that are to be overlapped with the symbols in the PUSCHs with higher priority, and then sends the PUSCHs on different carriers; when the symbols in the PUSCHs with the same priority are to be overlapped in the time domain, said sending module simultaneously sends the PUSCHs with the same priority.

Preferably, said sending rules comprise:

When said uplink channels in which symbols are to be overlapped in the time domain on different carriers are PUSCHs and SRSs, said sending module may select any of the following methods to process:

method one: said sending module simultaneously sends the PUSCHs and the SRSs on different carriers;

method two: said sending module discards the SRSs and only sends the PUSCHs;

method three: said sending module discards the PUSCHs and only sends the SRSs;

method four: said sending module empties the symbols in the PUSCHs that are overlapped with the SRSs, and then sends the PUSCHs and SRSs on different carriers.

Preferably, when the PUSCHs on more than two different carriers and the SRSs on more than two different carriers have symbols to be overlapped in the time domain, after processing all the overlapped SRSs and PUSCHs according to the method four, there are still symbols to be overlapped in the time domain in said more than two PUSCHs, then said sending module selects any of the following methods to process said more than two PUSCHs:

method one: said sending module simultaneously sends the PUSCHs on different carriers;

method two: according to certain priorities, said sending module discards the PUSCHs with lower priority and sends the PUSCHs with higher priority; when the PUSCHs with the same priority have symbols to be overlapped in the time domain, said sending module simultaneously sends the PUSCHs with the same priority;

method three: according to the priority rule, said sending module empties the symbols in the PUSCHs with lower priority that are to be overlapped with the symbols in the PUSCHs with higher priority, and then sends the PUSCHs on different carriers; when the PUSCHs with the same priority have symbols to be overlapped in the time domain, said sending module simultaneously sends the PUSCHs with the same priority.

Preferably, said sending rules comprise:

When the uplink channels in which symbols are to be overlapped in the time domain on different carriers are PUCCHs and SRSs, said sending module selects any of the following methods to process:

method one: said sending module simultaneously sends the PUCCHs and SRSs on different carriers;

method two: said sending module discards the SRSs and only sends the PUCCHs.

Preferably, said sending rules comprise:

when the SRSs and PUCCHs on multiple different carriers have symbols to be overlapped in the time domain, said sending module selects any of the following methods to process:

method one: said sending module simultaneously sends the PUCCHs and SRSs on multiple different carriers;

method two: said sending module discards all the SRSs, and only sends the PUCCHs;

method three: said sending module discards all the periodic SRS in which symbols are to be overlapped, and simultaneously sends all the aperiodic SRSs and PUCCHs in which symbols are to be overlapped.

Preferably, said predefined rules comprises triggering rules and sending rules; in the case that said triggering rules are met, process said uplink channels and/or uplink signals according to said sending rules;

Said triggering rules are at least one of the following rules:

the difference of the timing advances of different uplink carriers configured by Said eNB for said UE exceeds the first preset threshold value; or, said UE finds out that the difference of the actual transmission time of the configured different uplink carriers exceeds the second preset threshold value;

or, said UE is configured with multiple timing advances, when the uplink channels carried on different carriers have symbols not aligned in the time domain, and the symbols on different carriers are to be overlapped in the time domain, it is determined that the sum of the transmission power of each uplink channel of said UE exceeds the maximum transmission power configured by said UE.

In the following, the present document will be further described with a plurality of application examples in combination with the accompanying drawings.

Application Example 1

In the following application examples 1-1 to 1-5, said UE is configured with two uplink carriers CC1 and CC2, wherein the CC1 is a PCell and the CC2 is a SCell. Said CC1 and said CC2 belong to different TA groups, wherein the CC1 belongs to the TA group 1 and the CC2 belongs to the TA group 2.

Application Example 1-1

Figure 3:
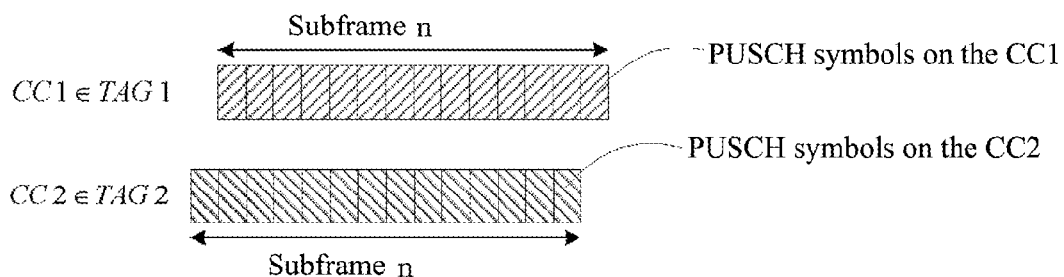
FIG. 3 is a schematic diagram of an uplink signal in accordance with the application example 1-1 and the application example 1-2 of the present document.

As shown in FIG. 3, in subframe n, both the CC1 and the CC2 need to send the PUSCHs. Since the CC1 and the CC2 have different TAs, the PUSCH symbols in the sub-frame n on the CC1 are overlapped with the PUSCH symbols in the subframe n on the CC2. The TAG in FIG. 3 represents the TA group, so as those in the following drawings.

At this time, if said eNB signaling instructs said UE to simultaneously send the PUSCHs on both the CC1 and the CC2, said UE directly sends the PUSCHs on both the CC1 and the CC2, or the UE simultaneously sends the PUSCHs on both the CC1 and the CC2 according to predefined rules 1).

Application Example 1-2

As shown in FIG. 3, in the subframe n, both the CC1 and the CC2 need to send the PUSCHs. Since the CC1 and the CC2 have different TAs, the PUSCH symbols in the sub-frame n on the CC1 are partially overlapped with the PUSCH symbols in the subframe n on the CC2. Moreover, the PUSCH in the CC1 carries UCI, while the PUSCH in the CC2 does not.

If at this time the eNB instructs the UE via signaling to discard the PUSCH on one of the CCs in accordance with the priority rule, or the UE discards the PUSCH on one of the CCs according to the priority rule according to the method b) in the predefined rule 1), then:

If method II) is used to determine the priority at this time, that is, determining the priority according to the carrier carrying the PUSCH, since the CC1 is a PCell, the priority of the PUSCH on the CC1 is higher than that of the PUSCH on the CC2, and the UE discards the PUSCH on the CC2, while only sends the PUSCH on the CC1;

if method I) is used to determine the priority at this time, that is, determining the priority according to whether it carries the UCI or not, since the PUSCH in the CC1 carries the UCI, the priority of the PUSCH on the CC1 is higher than that of the PUSCH on the CC2, and the UE discards the PUSCH on the CC2, while only sends the PUSCH on the CC1.

Application Example 1-3

Figure 4:
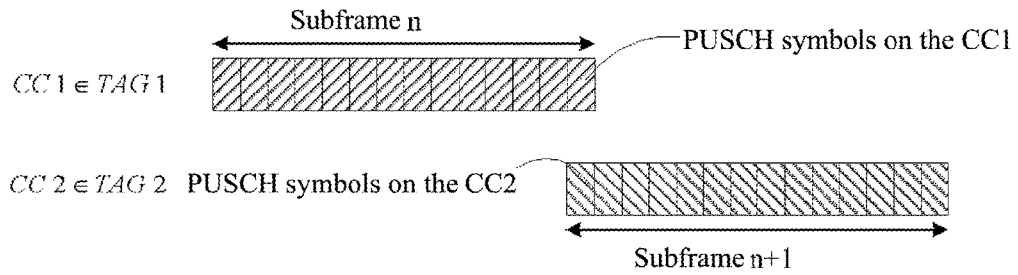
FIG. 4 is a schematic diagram of an uplink signal in the application example 1-3 of the present document.

As shown in FIG. 4, in the subframe n, the CC1 needs to send the PUSCH, and in the subframe n+1, the CC2 needs to send the PUSCH. Since the CC1 and the CC2 have different TAs, the last PUSCH symbol in the sub-frame n on the CC1 is partially overlapped with the first PUSCH symbol in the subframe n+1 on the CC2. Moreover, the PUSCH on the CC1 carries the UCI, while the PUSCH on the CC2 does not.

At this time, if the eNB instructs the UE via signaling to perform rate matching for one PUSCH according to the priority rule, and empty the symbol that is overlapped with another PUSCH symbol, or according to the method c) in the predefined rule 1), said UE performs rate matching for one PUSCH according to the priority rule, and empties the symbol that is overlapped with another PUSCH symbol, then:

if the method I) is used to determine the priority at this time, that is, the priority is determined according to whether the UCI is carried or not, since the PUSCH in the CC1 carries the UCI, the priority of the PUSCH on the CC1 is higher than that of the PUSCH on the CC2, therefore the UE performs rate matching for the PUSCH on the CC2, empties the first PUSCH symbol on the CC2, and then sends the other PUSCH symbols on the CC1 in the sub-frame n and on the CC2 in the subframe n+1;

if Method II) is used to determine the priority at this time, that is, the priority is determined according to the carriers carrying the PUSCH, since the CC1 is a PCell, the priority of the PUSCH on the CC1 is higher than that of the PUSCH on the CC2, therefore, said UE performs rate matching for the PUSCH on the CC2, while empties the first symbol in the PUSCH on the CC2, and then sends the PUSCHs on the CC1 in the subframe n and on the CC2 in the subframe n+1;

if method III) is used to determine the priority at this time, that is, the priority is determined according to the subframe indexes, and it is regulated that the PUSCH in the former subframe is higher than that of PUSCH in the latter subframe, since the subframe index corresponding to the PUSCH on the CC1 is n, while the subframe index corresponding to the PUSCH on the CC2 is n+1, the priority of the PUSCH on the CC1 is higher than that of the PUSCH on the CC2, therefore said UE performs rate matching for the PUSCH on the CC2, empties the first symbol in the PUSCH on the CC2, and then sends the PUSCHs on the CC1 in the subframe n and on the CC2 in the subframe n+1;

if method IV) is used to determine the priority at this time, that is, the priority is determined according to the subframe indexes, and it is regulated that the PUSCH in the latter subframe is higher than the PUSCH in the former subframe, since the subframe index corresponding to the PUSCH on the CC1 is n, while the subframe index corresponding to the PUSCH on the CC2 is n+1, the priority of the PUSCH on the CC2 is higher than that of the PUSCH on the CC1, therefore, the UE performs rate matching for the PUSCH on the CC1, empties the last symbol in the PUSCH on the CC1, and then sends the PUSCHs on the CC1 in subframe n and on the CC2 in the sub-frame n+1.

Application Example 1-4

As shown in FIG. 3, in the subframe n, both the CC1 and the CC2 need to send the PUSCHs. Since the CC1 and the CC2 have different TAs, the PUSCH symbols in the subframe n on the CC1 are partially overlapped with the PUSCH symbols in the subframe n on the CC2. Wherein, the PUSCH on the CC1 is newly sent data, while the PUSCH on the CC2 is resent data.

At this time, if the eNB instructs the UE via signaling to perform rate matching for one of the PUSCHs according to their priorities, and to empty the symbol that is overlapped with the other PUSCH symbol, or according to predefined rules 1), the UE performs rate matching for one of the PUSCHs according to their priorities, and empties the symbol that is overlapped with the other PUSCH symbol, and if method VI) is used to determine the priority at this time, then since the PUSCH in the CC1 carries newly sent data, while the PUSCH on the CC2 carries resent data, the priority of the PUSCH on the CC1 is higher than that of the PUSCH on the CC2, then said UE discards the PUSCH on the CC2, while only sends the PUSCH on the CC1.

Application Example 1-5

As shown in FIG. 4, in the subframe n, the CC1 needs to send the PUSCH, and in the subframe n+1, the CC2 needs to send the PUSCH. Since the CC1 and the CC2 have different TAs, the last PUSCH symbol in the sub-frame n on the CC1 is partially overlapped with the first PUSCH symbol in the subframe n on the CC2. Wherein, the PUSCH on the CC1 carries newly sent data, while the PUSCH on the CC2 carries resent data.

If at this time the eNB instructs the UE via signaling to discard the PUSCH on one of the CCs in accordance with their priorities, or according to the method c) in the predefined rules 1), said UE performs rate matching for one of the PUSCHs according to their priorities, and empties the symbol that is overlapped with the other PUSCH symbol, the if the prioritizing method at this time is the method VI), the priority of the PUSCH on the CC1 is higher than that of the PUSCH on the CC2 since the PUSCH on the CC1 is newly sent data and the PUSCH on the CC2 is resent data, therefore, the UE performs rate matching for the PUSCH on the CC2 in the subframe n+1, empties the first PUSCH symbol on the CC2 in the sub-frame n+1, and sends the PUSCH on the CC1 in the sub-frame n and the PUSCH on the CC2 in the subframe n+1.

Application Example 2

In the following application examples 2-1 to 2-3, said UE is configured with two uplink carriers CC1 and CC2, wherein the CC1 is a PCell and the CC2 is a SCell. The CC1 and the CC2 belong to different TA groups, wherein said CC1 belongs to the TA group 1, and said CC2 belongs to the TA group 2.

Application Example 2-1

Figure 5:
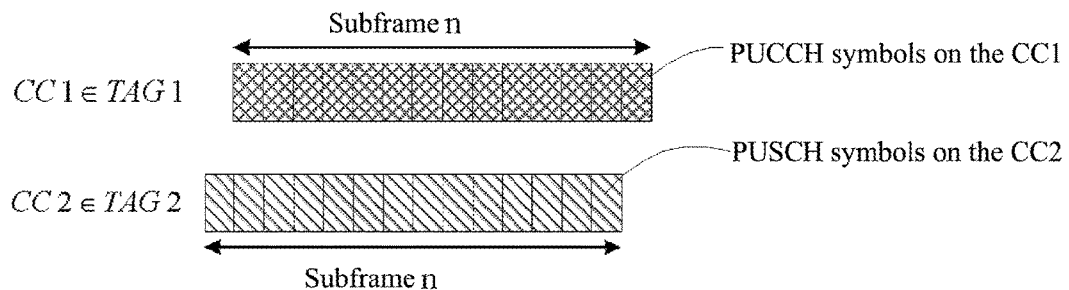
FIG. 5 is a schematic diagram of an uplink signal in the application example 2-1 and application example 2-2 of the present document.

As shown in FIG. 5, in the subframe n, the CC1 needs to send the PUCCH, while the CC2 needs to send the PUSCH. Since the CC1 and the CC2 have different TAs, the PUCCH symbol in the sub-frame n on the CC1 is partially overlapped with the PUSCH symbol in the subframe n on the CC2.

At this time, if the eNB instructs the UE via the signaling to simultaneously send the PUCCH on the CC1 and the PUSCH on the CC2, or the UE simultaneously sends the PUSCH on the CC1 and the PUCCH on the CC2 according to the method a) in the predefined rules 2), the UE directly sends the PUSCH on the CC1 and the PUCCH on the CC2.

Application Example 2-2

As shown in FIG. 5, in the subframe n, the CC1 needs to send the PUCCH, and the CC2 needs to send the PUSCH. Since the CC1 and the CC2 have different TAs, the PUCCH symbol in the subframe n on the CC1 is partially overlapped with the PUSCH symbol in the subframe n on the CC2.

At this time, if the eNB instructs the UE via signaling to discard the PUSCH on the CC2 and only send the PUCCH on the CC1, or the UE discards the PUSCH which has symbol overlapped the PUCCH according to the method b) in the predefined rules 2), the UE discards the PUSCH on the CC2 and only sends the PUCCH on the CC1.

Application Example 2-3

Figure 6:
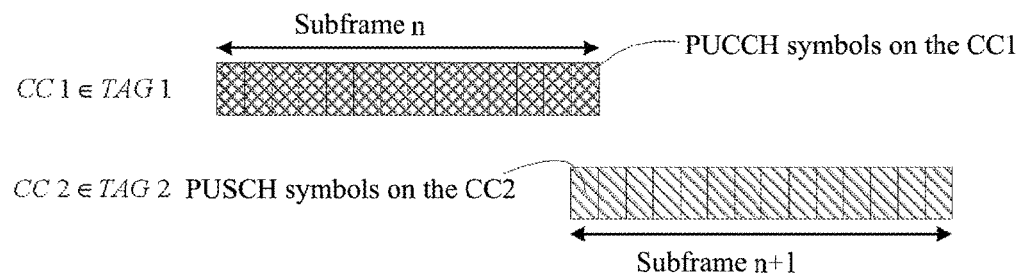
FIG. 6 is a schematic diagram of an uplink signal in accordance with the application example 2-3 of the present document.

As shown in FIG. 6, in the subframe n, the CC1 needs to send the PUCCH, while in the sub-frame n+1, the CC2 needs to send the PUSCH. Since the CC1 and the CC2 have different TAs, the last PUCCH symbol in the subframe n on the CC1 is partially overlapped with the first PUSCH symbol in the subframe n+1 on the CC2.

At this time, if the eNB instructs the UE via the signaling to perform rate matching for the PUSCH on the CC2, empty the first PUSCH symbol in the subframe n+1 on the CC2, and then send the PUCCH on the CC1 in the subframe n and the PUSCH on the CC2 in the sub-frame n+1, or the UE performs rate matching for the PUSCH in which symbol is overlapped with the PUCCH and empties the PUSCH symbol that is overlapped with the PUCCH according to the method c) in the predefined rules 2), then said UE performs rate matching for the PUSCH on the CC2, empties the first PUSCH on the CC2, and then sends the PUCCH on the CC1 in the sub-frame n and the PUSCH on the CC2 in the sub-frame n+1.

Application Example 3

In the following application examples 3-1 to 3-4, said UE is configured with two uplink carriers CC1 and CC2, wherein the CC1 is a PCell and the CC2 is a SCell. The CC1 and the CC2 belong to different TA groups, wherein the CC1 belongs to the TA group 1 and the CC2 belongs to the TA group 2.

Application Example 3-1

Figure 7:
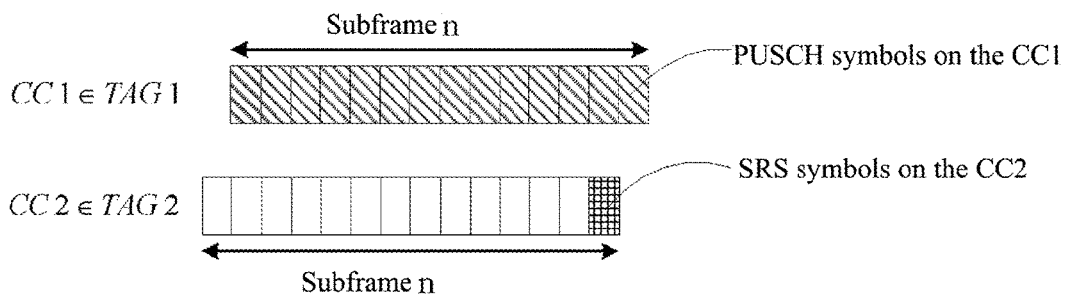
FIG. 7 is a schematic diagram of an uplink signal in accordance with the application example 3-1, the application example 3-2 and the application example 3-3 of the present document.

As shown in FIG. 7, in the subframe n, the CC1 needs to send the PUSCH and the CC2 needs to send the SRS. Since the CC1 and the CC2 have different TA, the PUSCH symbol in the sub-frame n on the CC1 is overlapped with the SRS symbol in the sub-frame n on the CC2.

At this time, if the eNB instructs the UE via signaling to simultaneously send the PUSCH on the CC1 and the SRS on the CC2, or the UE simultaneously sends the PUSCH on the CC1 and the SRS on the CC2 according to the method a) in the predefined rule 3), then said UE simultaneously sends the PUSCH on the CC1 and the SRS on the CC2.

Application Example 3-2

As shown in FIG. 7, in the subframe n, the CC1 needs to send the PUSCH and the CC2 needs to send the SRS. Since the CC1 and the CC2 have different TAs, the PUSCH symbol in the subframe n on the CC1 is overlapped with the SRS symbol in the sub-frame n on the CC2.

At this time, if the eNB instructs the UE via signaling to discard the PUSCH on the CC1 and only send the SRS on the CC2, or the UE discards the PUSCH that has symbol overlapped with the SRS in the time domain according to the method c) in the predefined rule 3), then the UE discards the PUSCH on the CC1, while only sends the SRS on the CC2.

Application Example 3-3

As shown in FIG. 7, in the subframe n, the CC1 needs to send the PUSCH and the CC2 needs to send the SRS. Since the CC1 and the CC2 have different TAs, the PUSCH symbol in the subframe n on the CC1 is overlapped with the SRS symbol in the subframe n on the CC2.

At this time, if the eNB instructs the UE via signaling to discard the SRS on the CC2 and only send the PUSCH on the CC1, or the UE discards the SRS which has symbol overlapped with the PUSCH in the time domain according to the method b) in the predefined rule 3), then said UE discards the SRS on the CC2 and only sends the PUSCH on the CC1.

Application Example 3-4

Figure 8:
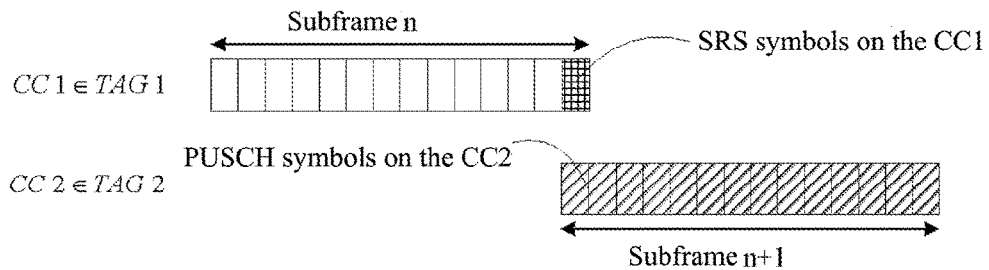
FIG. 8 is a schematic diagram of an uplink signal in accordance with the application example 3-4 of the present document.

As shown in FIG. 8, in the subframe n, the CC1 needs to send the SRS, and in the subframe n+1, the CC2 needs to send the PUSCH. Since the CC1 and the CC2 have different TAs, the SRS symbol in the subframe n on the CC1 is overlapped with the PUSCH symbol in the subframe n+1 on the CC2.

At this time, if the eNB instructs the UE via the signaling to perform rate matching for the PUSCH on the CC2 and empty the symbol in the PUSCH that is overlapped with the SRS on the CC1 in the time domain, or the UE performs rate matching for the PUSCH on the CC2 and empties the rate matched PUSCH symbol that is overlapped with the SRS symbol in the time domain according to the method d) in the predefined rule 3), then the UE performs rate matching for the PUSCH on the CC2, empties the first PUSCH symbol on the CC2, and sends the SRS on the CC1 in the subframe n and the PUSCH on the CC2 in the subframe n+1.

Application Example 4

In the following application examples 4-1 and 4-2, the UE is configured with two uplink carriers CC1 and CC2, wherein the CC1 is a PCell and the CC2 is a SCell. The CC1 and the CC2 belong to different TA groups, wherein the CC1 belongs to the TA group 1 and the CC2 belongs to the TA group 2.

Application Example 4-1

Figure 9:
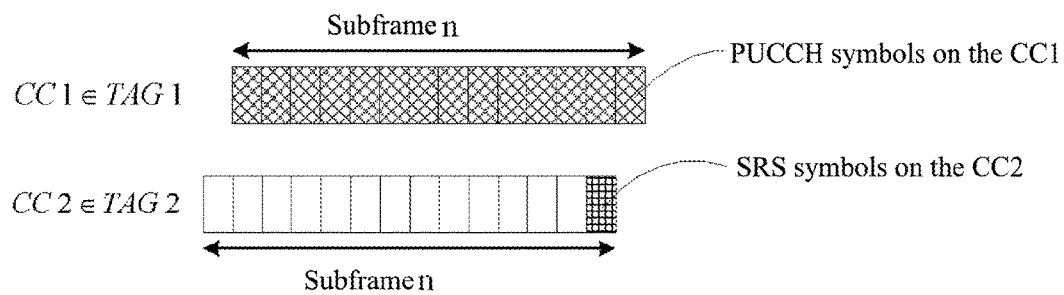
FIG. 9 is a schematic diagram of an uplink signal in accordance with the application example 4-1 and the application example 4-2 of the present document.

As shown in FIG. 9, in the subframe n, the CC1 needs to send the PUCCH, and the CC2 needs to send the SRS. Since the CC1 and the CC2 have different TAs, the PUCCH symbol in the subframe n on the CC1 is overlapped with the SRS symbol in the subframe n on the CC2.

If at this time the eNB instructs the UE via the signaling to simultaneously send the PUCCH on the CC1 and the SRS on the CC2, or the UE simultaneously sends the PUCCH on the CC1 and the SRS on the CC2 according to the method a) in the predefined rule 4), then the UE simultaneously sends the PUCCH on the CC1 and the SRS on the CC2.

Application Example 4-2

As shown in FIG. 9, in the subframe n, the CC1 needs to send the PUCCH and the CC2 needs to send the SRS. Since the CC1 and the CC2 have different TAs, the PUCCH symbol in the subframe n on the CC1 is overlapped with the SRS symbol in the subframe n on the CC2.

At this time, if the eNB instructs the UE via the signaling to discard the SRS on the CC2 and only send the PUCCH on the CC1, or the UE discards the SRS which has symbol overlapped with the PUCCH according to the method b) in the predefined rule 4), then said UE discards the SRS on the CC2 and sends the PUCCH on the CC1.

Application Example 5

In the following application examples 5-1 to 5-3, the UE is configured with three uplink carriers, which are the CC1, CC2 and CC3 respectively, wherein the CC1 is a PCell, and the CC2 and the CC3 are SCells. Wherein the CC1 belongs to the TA group 1 and the CC2 and the CC3 belong to the TA group 2.

Application Example 5-1

Figure 10:
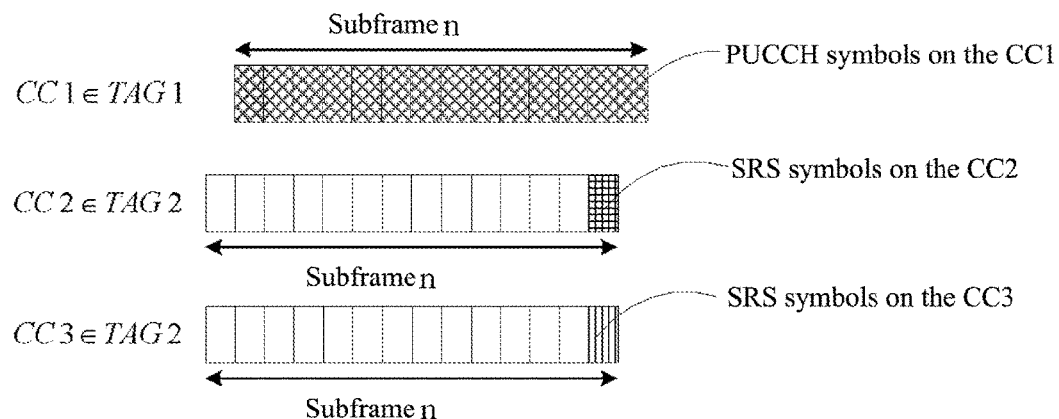
FIG. 10 is a schematic diagram of an uplink signal in accordance with the application example 5-1, the application example 5-2 and the application example 5-3 of the present document.

As shown in FIG. 10, in the subframe n, the CC1 needs to send the PUCCH, and both the CC2 and the CC3 need to send the SRS, wherein the CC2 is aperiodic SRS and the CC3 is periodic SRS. Since the CC1, CC2 and CC3 have different TAs, the PUCCH symbol in the subframe n on the CC1, the SRS symbol in the subframe n on the CC2, and the SRS symbol in the subframe n on the CC3 are overlapped.

At this time, if the eNB instructs the UE via signaling to simultaneously send the PUCCH on the CC1 and the SRS on both the CC2 and the CC3, or the UE simultaneously sends the SRS and the PUCCH according to the method a) in the predefined rule 5), then the UE simultaneously sends the PUCCH on the CC1 and the SRS on both the CC2 and the CC3.

Application Example 5-2

As shown in FIG. 10, in the subframe n, the CC1 needs to send the PUCCH, while both the CC2 and the CC3 need to send the SRS, wherein the CC2 is aperiodic SRS and the CC3 is periodic SRS. Since the CC1, CC2 and CC3 have different TAs, the PUCCH symbol in the subframe n on the CC1 is overlapped with the SRS symbol in the subframe n on the CC2 and the SRS symbol in the subframe n on the CC3.

At this time, if the eNB instructs the UE via signaling to discard the SRSs on the CC2 and the CC3 and only send the PUCCH on the CC1, or the UE discards the SRSs and only send the PUCCH according to the method b) in the predefined rule 5), then the UE discards the SRSs on the CC2 and the CC3 and only sends the PUCCH on the CC1.

Application Example 5-3

As shown in FIG. 10, in the subframe n, the CC1 needs to send the PUCCH, while both the CC2 and the CC3 need to send the SRS, wherein the CC2 is aperiodic SRS and the CC3 is periodic SRS. Since the CC1, CC2 and CC3 have different TAs, the PUCCH symbol in the subframe n on the CC1 is overlapped with the SRS symbol in the sub-frame n on the CC2 and the SRS symbol in the subframe n on the CC3.

At this time, if the eNB instructs the UE via signaling to discard the periodic SRS on the CC3 and only send the PUCCH on the CC1 and the aperiodic SRS on the CC2, or the UE discards the periodic SRS and only sends the PUCCH and the non-periodic SRS according to the method c) in the predefined rule 5), then the UE discards the periodic SRS on the CC3 and sends the PUCCH on the CC1 and the aperiodic SRS on the CC2.

This embodiment provides an uplink signal power reduction method in the carrier aggregation system and uses the following scheme:

The user equipment is configured with multiple TAs, when the symbols in uplink channels carried on different carriers are not aligned in the time domain, and the symbols on different carriers are overlapped in the time domain, if the sum of transmission power of each uplink channel of the UE is determined exceeding the maximum transmission power configured by the UE, then the evolved NodeB instructs the UE to reduce the transmission power of the uplink channels in which the symbols are overlapped in the time domain and that are carried on different carriers.

Specifically, the evolved NodeB may instruct the UE through a physical layer signaling or higher layer signaling to reduce the transmission power of the uplink channels in which symbols are overlapped in the time domain on different carriers.

Furthermore, the evolved NodeB can instruct the predefined rules for the UE reducing the power;

then said UE reduces the transmission power of the uplink channels in which symbols on different carriers are overlapped in the time domain on different carriers according to the predefined rules instructed by the evolved NodeB.

Alternatively, the evolved NodeB may also instruct the UE of the power reduction method, and or the power reduction object;

Then the UE reduces the transmission power of the power reduction object (that is, the designated uplink channels) according to the power reduction method instructed by the evolved NodeB.

Figure 12:
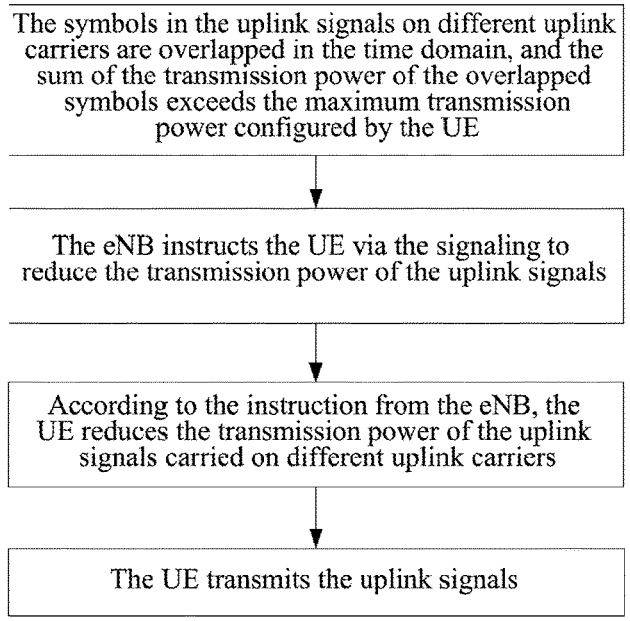
FIG. 12 is a flow chart of an uplink signal power reduction method in a carrier aggregation system in accordance with a first embodiment of the present document.

As shown in FIG. 12, the uplink signal power reduction method in the carrier aggregation system in accordance with the present embodiment mainly comprises the following steps:

step one, in a carrier aggregation system configured with the MTA, the UE finds out that the symbols in the uplink signals carried on different uplink carriers are overlapped in the time domain, and the sum of the transmission power of the overlapped symbols exceeds the maximum transmission power configured by the UE.

Step two, the eNB notifies the UE via signaling about how to reduce the transmission power of the uplink signals;

for example, the evolved NodeB informs the UE to reduce power according to specified predefined rules, or the evolved NodeB instructs the UE to reduce the transmission of the specified power reduction object (the uplink channels), and specify the power reduction method.

Wherein, the evolved NodeB may instruct the UE to reduce the transmission power of all the uplink channels; or may also instruct the UE to reduce only the power of the overlapped symbols on different channels, while not reduce the power of the symbols that are not overlapped.

Wherein, the power reduction method specified by the evolved NodeB may be: reduce the transmission power of the uplink channels on different carriers by a same ratio; reduce power based on the priorities of the uplink channels, first reduce the transmission power of the uplink channels with lower priority, and then reduce the transmission power of the uplink channels with higher priority, and the like.

Step three, according to the instructions from the eNB, the UE reduces the transmission power of the uplink signals on different uplink carriers.

Step four, reduce the transmission power, until the transmission power of the UE does not exceed the maximum transmission power configured by the UE, and the UE transmits the uplink signals.

Furthermore, in the abovementioned embodiment, if the UE determines that the sum of the transmission power of each uplink channel exceeds the maximum transmission power configured by the UE, the UE may inform the evolved NodeB through the physical layer uplink signaling, so that the evolved NodeB learns that the UE is in the power limited state.

An uplink signal power reduction method in a carrier aggregation system provided in another embodiment of the present document, uses the following scheme:

the user equipment is configured with multiple TAs, when the signals in the uplink channels carried by different carriers are not aligned in the time domain, and the symbols on different carriers are overlapped in the time domain, if the sum of the transmission power of each uplink channel of said UE is determined exceeding the maximum transmission power configured by the UE, then the UE reduces the transmission power of the uplink channels in which symbol are overlapped in the time domain on different carriers according to the predefined rules.

Figure 13:
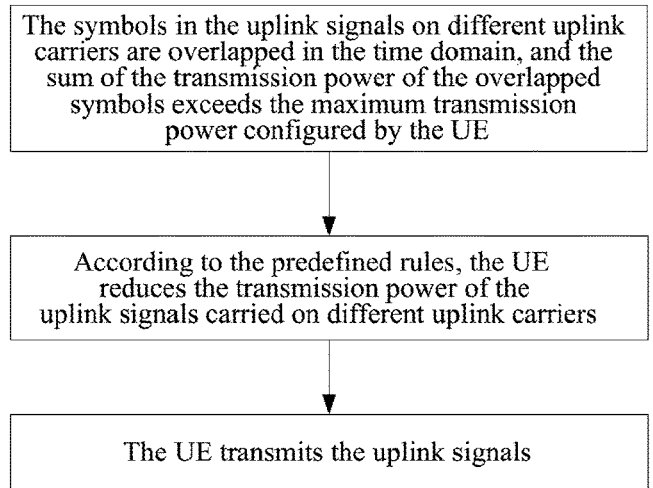
FIG. 13 is a flow chart of an uplink signal power reduction method in a carrier aggregation system in accordance with a second embodiment of the present document.

As shown in FIG. 13, the present embodiment provides an uplink signal power reduction method in the carrier aggregation system and uses the following scheme:

step one, in a carrier aggregation system configured with the MTA, the UE finds out that the symbols in the uplink signals carried on different uplink carriers are overlapped in the time domain, and the sum of the transmission power of the overlapped symbols exceeds the maximum transmission power configured by the UE.

Step two, the UE reduces the transmission power of the uplink signals on different uplink carriers according to the predefined rules.

Wherein, the UE can reduce the transmission power of all the uplink channels by the same ratio; or, can also reduce the power according to the priorities of the uplink channels, first reduce the transmission power of the uplink channels with lower priority, and then reduce the transmission power of the uplink channels with higher priority; or, might also only reduce the power of the symbols that are overlapped on different channels, but not reduce the power of the symbols that are not overlapped; and so on.

Step three, reduce the transmission power of the UE, until the transmission power of the UE does not exceed the maximum transmission power configured by the UE, and the UE transmits the uplink signals.

Furthermore, in the abovementioned embodiment, said uplink channels are PUSCH, and/or PUCCH, and/or PRACH.

Furthermore, in the abovementioned embodiment, the method for the UE judging whether the sum of the transmission power of each uplink channel exceeds the maximum transmission power configured by the UE or not can be one of the following methods:

1) the UE judges whether the sum of the power of the uplink channels carried on each uplink channel in the current subframe exceeds the maximum transmission power configured by the UE or not.

2) the UE judges whether the sum of the power of the uplink channels carried on each uplink carrier in the current subframe and the power of the uplink channels carried in each uplink carrier that are ready to be sent in the next subframe exceeds the maximum transmission power configured by the UE or not.

Furthermore, in the abovementioned embodiment, the abovementioned predefined rules are at least one of the following rules:

rule 1, equal-ratio reduce the transmission power of the uplink channels on each uplink carrier, until the transmission power of the UE does not exceed the maximum transmission power configured by the UE.

rule 2, according to certain priorities, reduce the power of each uplink channel, and first reduce of the transmission power of one or more uplink channels with lower priority, and then reduce the transmission power of one or more uplink channels with higher priority.

Rule 3, only reduce the transmission power of the symbols that are overlapped on different channels, and do not reduce the transmission power of the symbols that are not overlapped.

Furthermore, in the abovementioned predefined rule 2, the number of uplink channels with the same priority may be one or more.

Still furthermore, in the abovementioned predefined rule 2, if the total transmission power of the uplink channels of the UE does not exceed the maximum transmission power configured by the UE after reducing the transmission power of one or more uplink channels with lower priority, do not reduce the transmission power of one or more uplink channels with higher priority.

Still furthermore, in the abovementioned-predefined rule 2, if the power reduction objects are multiple uplink channels, the power reduction method is equal-ratio reduction.

Still furthermore, the prioritizing method in the abovementioned rule 2 is one or a combination of multiple of the following methods:

prioritizing method 1: prioritizing in accordance with the channel types, and their priorities from high to low can be: PUCCH, PUSCH.

prioritizing method 2: prioritizing in accordance with the carriers carrying the uplink channels, their priorities from high to low can be: PCell, SCell.

prioritizing method 3: if the uplink channels in which symbols are overlapped in the time domain are multiple PUSCHs, in accordance with whether the UCI is carried to prioritize, and their priorities from high to low can be: PUSCHs carrying the UCI, PUSCHs not carrying the UCI.

Prioritizing method 4: prioritizing in accordance with the subframe indexes, and their priorities from high to low can be: uplink channels in the former sub-frame, and uplink channels in the latter sub-frame.

Prioritizing method 5: prioritizing in accordance with the subframe indexes, and its priorities from high to low can be: uplink channels in the latter sub-frame, uplink channels in the former sub-frame.

Prioritizing method 6, if the uplink channels in which the symbols are overlapped in the time domain are multiple PUSCHs, prioritizing in accordance with whether the PUSCH carries the resent data or not, and its priorities from high to low can be: PUSCH carrying newly sent data, PUSCH carrying resent data.

Furthermore, the power reduction method in the abovementioned predefined rule 3 can be equal-ratio reduction, or priority-based power reduction in the rule 2.

Hereinafter, the embodiments of the present document will be described in detail with combination of the accompanying drawings. It should be noted that, in the case of no conflict, the embodiments and the features in the embodiments in the present application may be arbitrarily combined with each other.

Embodiment 1'

The UE is configured with two uplink carriers CC1 and CC2, wherein the CC1 is a PCell and the CC2 is a SCell. The CC1 and the CC2 belong to different TA groups, wherein the CC1 belongs to the TA group 1 and the CC2 belongs to the TA group 2.

Embodiment 1'-1

Figure 14:
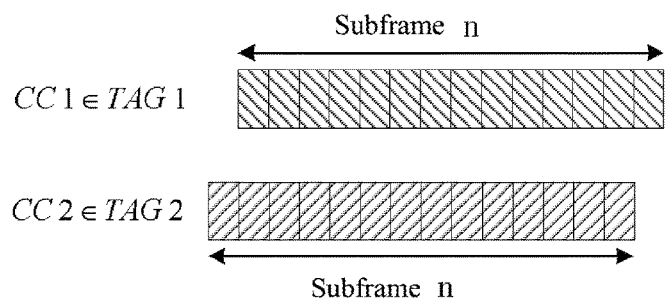
FIG. 14 is a schematic diagram of uplink symbols sent on different uplink component carriers being partially overlapped in accordance with embodiments 1'-1, 1'-2, 1'-3 and 1'-11 of the present document.

As shown in FIG. 14, in the subframe n, both the CC1 and the CC2 need to send the PUSCHs. Since the CC1 and the CC2 have different TA, the PUSCH symbol (labeled as §) in the subframe n on the CC1 is partially overlapped with the PUSCH symbol (labeled as ▓) in the subframe n on the CC2.

At this time, if the sum of the transmission power of the PUSCH on the CC1 and the transmission power of the PUSCH on the CC2 exceeds the maximum transmission power configured by the UE, then the eNB notifies the UE via signaling to simultaneously equal-ratio reduce the transmission power of the PUSCHs on the CC1 and the CCs and send the PUSCHs out; or according to the predefined rule 1, the UE reduces the transmission power of the uplink channels on all the carriers by the same ratio.

Then UE equal-ratio reduces the transmission power of the PUSCHs on the CC1 and CC2, until the sum of the transmission power of the PUSCHs on the CC1 and the CC2 does not exceed the maximum transmission power configured by the UE, and then the UE simultaneously sends the PUSCHs on the CC1 and the CC2.

Embodiment 1'-2

As shown in FIG. 3, in the subframe n, both the CC1 and the CC2 need to send the PUSCHs. Since the CC1 and the CC2 have different TAs, the PUSCH symbol (labeled as §) in the subframe n on the CC1 is partially overlapped with the PUSCH symbol (labeled as ▨) in the subframe n on the CC2.

At this time, if the sum of the transmission power of the PUSCH on the CC1 and the transmission power of the PUSCH on the CC2 exceeds the maximum transmission power configured by the UE, then according to the predefined rule 2, the eNB notifies the UE via the signaling to reduce power according to certain priorities, to ensure the transmission power of one or more uplink channels with higher priority, and reduce the transmission power of one or more uplink channels with lower priority; or according to the predefined rule 2, the UE reduces the power in accordance with the priority rule, ensures the transmission power of one or more uplink channels with higher priority, and reduces the transmission power of one or more uplink channels with lower priority.

If at this time is the prioritizing method is the abovementioned prioritizing method 2, since the CC1 is a PCell and the CC2 is a SCell, the priority of the PUSCH on the CC1 is higher than that of the PUSCH on the CC2.

The UE first reduces the transmission power of the PUSCH on the CC2, and then reduces the transmission power of the PUSCH on the CC1, until the total transmission power of the uplink channels of the UE is not higher than the maximum transmission power configured by the UE.

Embodiment 1'-3

As shown in FIG. 14, in the subframe n, both the CC1 and the CC2 need to send the PUSCHs. Wherein, the PUSCH on the CC1 carries the UCI and the PUSCH on the CC2 does not. Since the CC1 and the CC2 have different TAs, the PUSCH symbol (labeled as §) in the subframe n on the CC1 is partially overlapped with the PUSCH symbol (labeled as ▨) in the subframe n on the CC2.

At this time, if the sum of the transmission power of the PUSCH on the CC1 and the transmission power of the PUSCH on the CC2 exceeds the maximum transmission power configured by the UE, then according to the predefined rule 2, the eNB notifies the UE via the signaling to reduce power according to certain priorities, to ensure the transmission power of one or more uplink channels with higher priority, and to reduce the transmission power of one or more uplink channels with lower priority; or according to the predefined rule 2, the UE reduces power in accordance with the priority rule, ensures the transmission power of one or more uplink channels with higher priority, and reduces the transmission power of one or more uplink channels with lower priority.

If the prioritizing method at this time is the prioritizing method 3, since the PUSCH on the CC1 carries the UCI, while the PUSCH on the CC2 does not, the priority of the PUSCH on the CC1 is higher than that of the PUSCH on the CC2.

The UE first reduces the transmission power of the PUSCH on the CC2, and then reduce the transmission power of the PUSCH on the CC1 until the total transmission power of the uplink channels of the UE is not higher than the maximum transmission power configured by the UE.

Embodiment 1'-4

Figure 15:
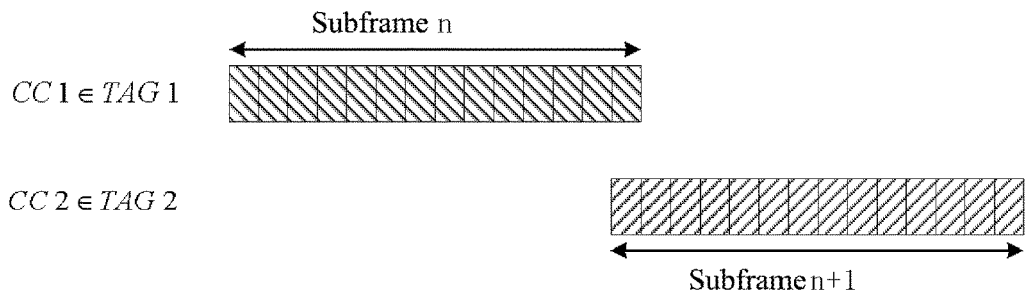
FIG. 15 is a schematic diagram of uplink symbols sent on different uplink component carriers being partially overlapped in accordance with embodiments 1'-4 and 1'-5 of the present document.

As shown in FIG. 15, in the subframe n, the CC1 needs to send the PUSCH, and in the sub-frame n+1, the CC2 also needs to send the PUSCH. Since the CC1 and the CC2 have different TAs, the PUSCH symbol (labeled as §) in the subframe n on the CC1 is partially overlapped with the PUSCH symbol (labeled as ▨) in the subframe n+1 on the CC2.

At this time, if the sum of the transmission power of the PUSCH in the subframe n on the CC1 and the transmission power of the PUSCH in the subframe n+1 on the CC2 exceeds the maximum transmission power configured by the UE, then according to the predefined rule 2, the eNB notifies the UE via the signaling to reduce power according to certain priorities, to ensure the transmission power of one or more uplink channels with higher priority, and to reduce the transmission power of one or more uplink channels with lower priority; or according to the predefined rule 2, the UE reduces power in accordance with said certain priority rule, ensures the transmission power of one or more uplink channels with higher priority, while reduces the transmission power of one or more uplink channels with lower priority.

If the prioritizing method at this time is the abovementioned prioritizing method 4, the priority of the PUSCH on the CC1 is higher than that of the PUSCH on the CC2.

The UE first reduces the transmission power of the PUSCH on the CC2, and then reduces the transmission power of the PUSCH on the CC1, until the total transmission power of the uplink channels of the UE is not higher than the maximum transmission power configured by the UE.

Embodiment 1'-5

As shown in FIG. 15, in the subframe n, the CC1 needs to send the PUSCH, and in the sub-frame n+1, the CC2 also needs to send the PUSCH. Since the CC1 and the CC2 have different TAs, the PUSCH symbol (labeled as §) in the subframe n on the CC1 is partially overlapped with the PUSCH symbol (labeled as ▨) in the subframe n+1 on the CC2.

At this time, if the sum of the transmission power of the PUSCH on the CC1 in the subframe n and the transmission power of the PUSCH on the CC2 in the subframe n+1 exceeds the maximum transmission power configured by the UE, then according to the predefined rule 2, the eNB notifies the UE via the signaling to reduce power according to certain priorities, to ensure the transmission power of one or more uplink channels with higher priority, and to reduce the transmission power of one or more uplink channels with lower priority; or according to the predefined rule 2, the UE reduces power in accordance with said certain priority rule, ensures the transmission power of one or more uplink channels with higher priority, while reduces the transmission power of one or more uplink channels with lower priority.

If the prioritizing method at this time is the abovementioned prioritizing method 5, the priority of the PUSCH on the CC2 is higher than that of the PUSCH on the CC1.

The UE first reduces the transmission power of the PUSCH on the CC1, and then reduces the transmission power of the PUSCH on the CC2, until the total transmission power of the uplink channels of the UE is not higher than the maximum transmission power configured by the UE.

Embodiment 1'-6

Figure 16:
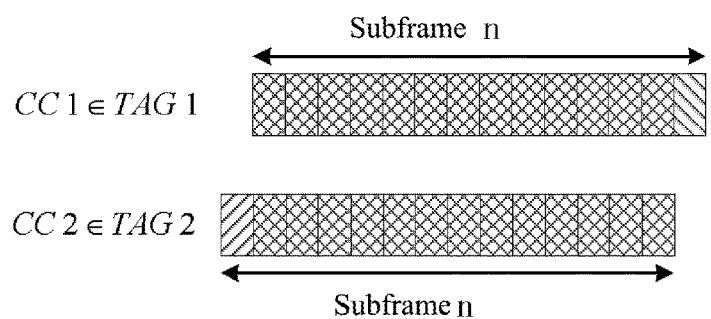
FIG. 16 is a schematic diagram of uplink symbols sent on different uplink component carriers being partially overlapped in accordance with embodiments 1'-6, 1'-7, and 1'-8 of the present document.

As shown in FIG. 16, in the subframe n, both the CC1 and the CC2 need to send the PUSCHs. Since the CC1 and the CC2 have different TAs, the PUSCH symbol (labeled as ▩) in the subframe n on the CC1 is partially overlapped with the PUSCH symbol (labeled as ▨) in the subframe n on the CC2, and the symbol in the overlapped part is labeled as ▦

Assuming that the sum of the transmission power of the PUSCH on the CC1 and the transmission power of the PUSCH on the CC2 exceeds the maximum transmission power configured by the UE, then, the eNB notifies the UE through signaling to equal-ratio reduce the power of the PUSCH symbols that are overlapped on the CC1 and the CC2; or according to a predefined rule 3, the UE equal-ratio reduces the power of the symbols that are overlapped on different channels, while does not reduce the power of the symbols that are not overlapped.

The UE equal-ratio reduces only the transmission power of the symbols (labeled as ▦) that are overlapped in the PUSCHs on the CC1 and the CC2, until the sum of the transmission power of the symbols that are overlapped in the PUSCHs on the CC1 and the CC2 does not exceed the maximum transmission power configured by the UE, and then the UE simultaneously sends the PUSCHs on the CC1 and the CC2.

Embodiment 1'-7

As shown in FIG. 16, in the subframe n, both the CC1 and the CC2 need to send the PUSCHs. Since the CC1 and the CC2 have different TAs, the PUSCH symbol (labeled as ▩) in the subframe n on the CC1 is partially overlapped with the PUSCH symbol (labeled as ▨) in the subframe n on the CC2, and the symbol in the overlapped part is labeled as ▦

Assuming that the sum of the transmission power of the PUSCH on the CC1 and the transmission power of the PUSCH on the CC2 exceeds the maximum transmission power configured by the UE, then, the eNB notifies the UE via signaling to equal-ratio reduce the power of the overlapped PUSCH symbols on the CC1 and the CC2 according to their priorities; or according to a predefined rule 3, the UE reduces the power of the symbols that are overlapped on different channels according to their priorities, while does not reduce the power of the symbols that are not overlapped.

If the prioritizing method is the abovementioned prioritizing method 2, since the CC1 is a PCell, and the CC2 is a SCell, the priority of the PUSCH on the CC1 is higher than that of the PUSCH on the CC2.

The UE first reduces the transmission power of the symbols that are overlapped in the PUSCH on the CC2, and then reduces the transmission power of the symbols that are overlapped in the PUSCH on the CC1, until the sum of the transmission power of the symbols that are overlapped in the PUSCH on the CC1 and the CC2 does not exceed the maximum transmission power configured by the UE, and then the UE simultaneously sends the PUSCHs on the CC1 and the CC2.

Embodiment 1'-8

As shown in FIG. 16, in the subframe n, both the CC1 and the CC2 need to send the PUSCHs. Wherein, the PUSCH in the CC1 carries the UCI while the PUSCH in the CC2 does not. Since the CC1 and CC2 have different TAs, the PUSCH symbol (labeled as ▩) in the subframe n on the CC1 is partially overlapped with the PUSCH symbol (labeled as ▨) in the subframe n on the CC2, and the symbol in the overlapped part is labeled as ▦

Assuming that the sum of the transmission power of the PUSCH on the CC1 and the transmission power of the PUSCH on the CC2 exceeds the maximum transmission power configured by the UE, then, the eNB notifies the UE via signaling to reduce the power of the overlapped PUSCH symbols on the CC1 and the CC2 according to their priorities; or according to the predefined rule 3, the UE reduces the power of the overlapped symbols on different channels according to their priorities, while does not reduce the power of the symbols that are not overlapped.

If the prioritizing method is the abovementioned prioritizing method 3, the priority of the PUSCH on the CC1 is higher than that of the PUSCH on the CC2.

The UE first reduces the transmission power of the symbols that are overlapped in the PUSCH on the CC2, and then reduces the transmission power of the symbols that are overlapped in the PUSCH on the CC1, until the sum of the transmission power of the symbols that are overlapped in the PUSCHs on the CC1 and the CC2 does not exceed the maximum transmission power configured by the UE, and then the UE simultaneously sends the PUSCHs on the CC1 and the CC2.

Embodiment 1'-9

Figure 17:
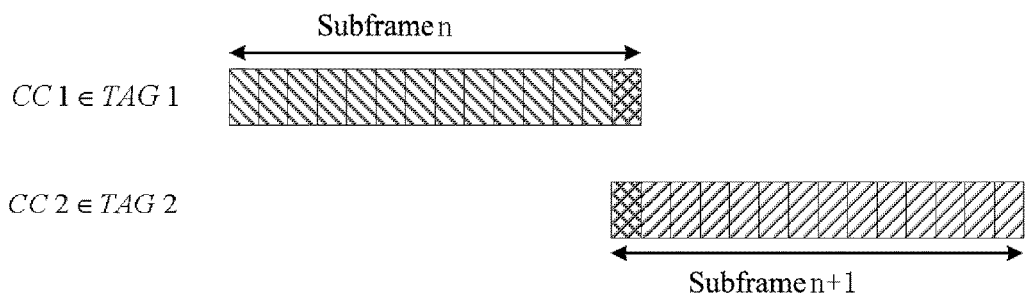
FIG. 17 is a schematic diagram of uplink symbols sent on different uplink component carriers being partially overlapped in accordance with embodiments 1'-9 and 1'-10 of the present document.

As shown in FIG. 17, in the subframe n, the CC1 needs to send the PUSCH, and in the subframe n+1, the CC2 need to send the PUSCH. Since the CC1 and the CC2 have different TAs, the PUSCH symbol (labeled as ▩) in the subframe n on the CC1 is partially overlapped with the PUSCH symbol (labeled as ▨) in the subframe n+1 on the CC2, and the symbol in the overlapped part is labeled as ▦

Assuming that the sum of the transmission power of the PUSCH on the CC1 and the transmission power of the PUSCH on the CC2 exceeds the maximum transmission power configured by the UE, then, the eNB notifies the UE via signaling to reduce the power of the PUSCH symbols that are overlapped on the CC1 and the CC2 according to their priorities; or according to a predefined Rule 3, the UE reduces the power of the symbols that are overlapped on different channels according to their priorities, while does not reduce the power of the symbols that are not overlapped.

If the prioritizing method is the abovementioned prioritizing method 4, the priority of the PUSCH on the CC1 is higher than that of the PUSCH on the CC2.

The UE first reduces the transmission power of the symbols that are overlapped in the PUSCH on the CC2, and then reduces the transmission power of the symbols that are overlapped in the PUSCH on the CC1, until the sum of the transmission power of the symbols that are overlapped in the PUSCHs on the CC1 and the CC2 does not exceed the maximum transmission power configured by the UE, and then the UE simultaneously sends the PUSCHs on the CC1 and the CC2.

Embodiment 1'-10

As shown in FIG. 17, in the subframe n, the CC1 needs to send the PUSCH, and in the subframe n+1, the CC2 needs to send the PUSCH. Since the CC1 and the CC2 have different TAs, the PUSCH symbol (labeled as ▩) in the subframe n on the CC1 is partially overlapped with the PUSCH symbol (labeled as ▨) in the subframe n+1 on the CC2, and the symbol in the overlapped part is labeled as ▩

Assuming that the sum of the transmission power of the PUSCH on the CC1 and the transmission power of the PUSCH on the CC2 exceeds the maximum transmission power configured by the UE, then, the eNB notifies the UE via signaling to reduce the power of the PUSCH symbols that are overlapped on the CC1 and the CC2 according to their priorities; or according to a predefined rule 3, the UE reduces the power of the symbols that are overlapped on different channels according to their priorities, while does not reduce the power of the symbols that are not overlapped.

If the prioritizing method is the abovementioned prioritizing 5, the priority of the PUSCH on the CC2 is higher than that of the PUSCH on the CC1.

The UE first reduces the transmission power of the symbols that are overlapped in the PUSCH on the CC1, and then reduces the transmission power of the symbols that are overlapped in the PUSCH on the CC2, until the sum of the transmission power of the symbols that are overlapped in the PUSCHs on the CC1 and the CC2 does not exceed the maximum transmission power configured by the UE, and then the UE simultaneously sends the PUSCHs on the CC1 and the CC2.

Embodiment 1'-11

As shown in FIG. 14, in the subframe n, both the CC1 and the CC2 need to send the PUSCHs. Wherein, the PUSCH on the CC1 carries newly sent data, while the PUSCH on the CC2 carries the resent data. Since the CC1 and the CC2 have different TAs, the PUSCH symbol (labeled as ▩) in the subframe n on the CC1 is partially overlapped with the PUSCH symbol (labeled as ▨) in the subframe n on the CC2.

At this time, if the sum of the transmission power of the PUSCH on the CC1 and the transmission power of the PUSCH on the CC2 exceeds the maximum transmission power configured by the UE, then according to the predefined rule 2, the eNB notifies the UE via the signaling to reduce power according to certain priorities, to ensure the transmission power of one or more uplink channels with higher priority, and to reduce the transmission power of one or more uplink channels with lower priority; or according to the predefined rule 2, the UE reduces power in accordance with the priority rule, ensures the transmission power of one or more uplink channels with higher priority, and reduces the transmission power of one or more uplink channels with lower priority.

If the prioritizing method at this time is the prioritizing method 6, since the PUSCH on the CC1 carries newly sent data, while the PUSCH on the CC2 carries the resent data, the priority of the PUSCH on the CC1 is higher than that of the PUSCH on the CC2.

The UE first reduces the transmission power of the PUSCH on the CC2, and then reduce the transmission power of the PUSCH on the CC1, until the total transmission power of the uplink channels of the UE is not higher than the maximum transmission power configured by the UE.

Embodiment 2'

The UE is configured with two uplink carriers CC1 and CC2, wherein the CC1 is a PCell and the CC2 is a SCell. The CC1 and the CC2 belong to different TA groups, wherein the CC1 belongs to the TA group 1 and the CC2 belongs to the TA group 2.

Embodiment 2'-1

Figure 18:
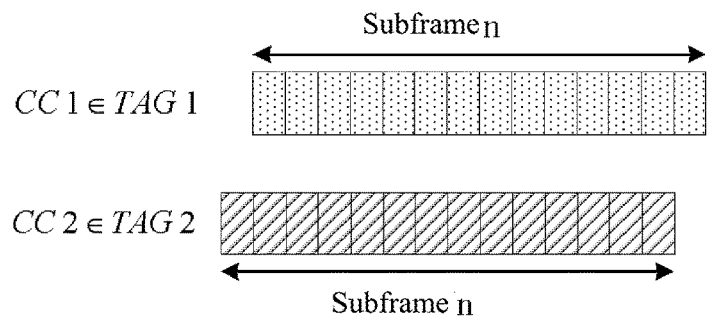
FIG. 18 is a schematic diagram of uplink symbols sent on different uplink component carriers being partially overlapped in accordance with embodiments 2'-1, 2'-2, and 2'-3 of the present document.

As shown in FIG. 18, in the subframe n, the CC1 needs to send the PUCCH and the CC2 needs to send the PUSCH. Since the CC1 and the CC2 have different TAs, the PUCCH symbol (labeled as ▢) in the subframe n on the CC1 is partially overlapped with the PUSCH symbol (labeled as ▨) in the subframe n on the CC2.

At this time, if the sum of the transmission power of the PUCCH on the CC1 and the transmission power of the PUSCH on the CC2 exceeds the maximum transmission power configured by the UE, then the eNB notifies the UE via signaling to equal-ratio reduce the transmission power of the PUCCH on the CC1 and of the PUSCH on the CC2 and then send the PUCCH on the CC1 and of the PUSCH on the CC2 out; or according to the predefined rule 1, the UE equal-ratio reduces the transmission power of the uplink channels on all the carriers.

The UE equal-ratio reduces the transmission power of the PUCCH on the CC1 and the PUSCH on the CC2, until the sum of the transmission power of the PUCCH on the CC1 and the PUSCH on the CC2 does not exceed the maximum transmission power configured by the UE, and then the UE simultaneously sends the PUCCH on the CC1 and the PUSCH on the CC2.

Embodiment 2'-2

As shown in FIG. 18, in the subframe n, the CC1 needs to send the PUCCH and the CC2 needs to send the PUSCH. Since the CC1 and the CC2 have different TAs, the PUCCH symbol (labeled as ▢) in the subframe n on the CC1 is partially overlapped with the PUSCH symbol (labeled as ▨) in the sub-frame n on the CC2.

At this time, if the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the PUSCH on the CC2; or according to the predefined rule 2, the UE reduces the transmission power of the uplink channels on all carriers according to their priorities.

If at this time is the prioritizing method is the abovementioned prioritizing method 1, the priority of the PUCCH on the CC1 is higher than that of the PUSCH on the CC2.

The UE first reduces the transmission power of the PUSCH on the CC2, and then reduces the transmission power of the PUCCH on the CC1, until the sum of the transmission power of the PUCCH on the CC1 and the transmission power of the PUSCH on the CC2 is not higher than the maximum transmission power configured by the UE. Then the UE sends the PUCCH on the CC1 and the PUSCH on the CC2.

Embodiment 2'-3

As shown in FIG. 18, in the subframe n, the CC1 needs to send the PUCCH and the CC2 needs to send the PUSCH. Since the CC1 and the CC2 have different TAs, the PUCCH symbol (labeled as ▦) in the subframe n on the CC1 is partially overlapped with the PUSCH symbol (labeled as ▨) in the subframe n on the CC2.

At this time, if the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the PUSCH on the CC2 according to their priorities; or according to the predefined rule 2, the UE reduces the transmission power of the uplink channels on all the carriers in accordance with their priorities.

If the prioritizing method at this time is the prioritizing method 2, the priority of the PUCCH on the CC1 is higher than that of the PUSCH on the CC2.

The UE first reduces the transmission power of the PUSCH on the CC2, and then reduce the transmission power of the PUCCH on the CC1, until the sum of the transmission power of the PUCCH on the CC1 and the transmission power of the PUSCH on the CC2 is not higher than the maximum transmission power configured by the UE. Then the UE sends the PUCCH on the CC1 and the PUSCH on the CC2.

Embodiment 2'-4

Figure 19:
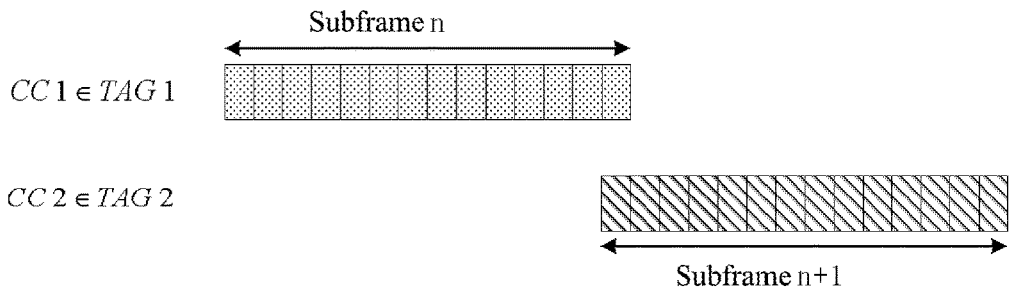
FIG. 19 is a schematic diagram of uplink symbols sent in different uplink component carriers being partially overlapped in accordance with embodiments 2'-4 and 2'-5 of the present document.

As shown in FIG. 19, in the subframe n, the CC1 needs to send the PUCCH, and in the subframe n+1, the CC2 needs to send the PUSCH. Since the CC1 and the CC2 have different TAs, the PUSCH symbol (labeled as ▦) in the subframe n on the CC1 is partially overlapped with the PUSCH symbol (labeled as ▨) in the subframe n+1 on the CC2.

If in the subframe n, the sum of the transmission power of the PUCCH in the subframe n on the CC1 and the transmission power of the PUSCH in the subframe n+1 on the CC2 exceeds the maximum transmission power configured by the UE, then the eNB notifies the UE via the signaling to reduce the transmission power of the PUCCH on the CC1 and the PUSCH on the CC2 according to their priorities; or according to the predefined rule 2, the UE reduces the transmission power of the uplink channels on all the carriers according to their priorities.

If the prioritizing method at this time is the abovementioned prioritizing method 4, the priority of the PUCCH on the CC1 is higher than that of the PUSCH on the CC2.

the UE first reduces the transmission power of the PUSCH in the subframe n+1 on the CC2, and then reduces the transmission power of the PUCCH in the subframe n on the CC1, until the sum of the transmission power of the PUCCH in the subframe n on the CC1 and the transmission power of the PUSCH in the subframe n+1 on the CC2 is not higher than the maximum transmission power configured by the UE. Then the UE sends the PUCCH on the CC1 and the PUSCH on the CC2.

Embodiment 2'-5

As shown in FIG. 19, in the subframe n, the CC1 needs to send the PUCCH, and in the subframe n+1, the CC2 needs to send the PUSCH. Since the CC1 and the CC2 have different TAs, the PUSCH symbol (labeled as ▦) in the subframe n on the CC1 is partially overlapped with the PUSCH symbol (labeled as ▨) in the subframe n+1 on the CC2.

If the sum of the transmission power of the PUCCH on the CC1 in the subframe n and the transmission power of the PUSCH on the CC2 in the sub-frame n+1 exceeds the maximum transmission power configured by the UE, then the eNB notifies the UE via the signaling to reduce the transmission power of the PUCCH on the CC1 and the transmission power of the PUSCH on the CC2 according to their priorities; or according to the predefined rule 2, the UE reduces the transmission power of the uplink channels on all the carriers according to their priorities.

If the prioritizing method at this time is the abovementioned prioritizing method 5, the priority of the PUSCH on the CC2 is higher than that of the PUCCH on the CC1.

The UE first reduces the transmission power of the PUCCH on the CC1 in the subframe n+1, and then reduces the transmission power of the PUSCH in the subframe n on the CC2, until the sum of the transmission power of the PUCCH on the CC1 in the subframe n and the transmission power of the PUSCH on the CC2 in the subframe n+1 is not higher than the maximum transmission power configured by the UE. Then the UE sends the PUCCH on the CC1 and the PUSCH on the CC2.

Embodiment 2'-6

Figure 20:
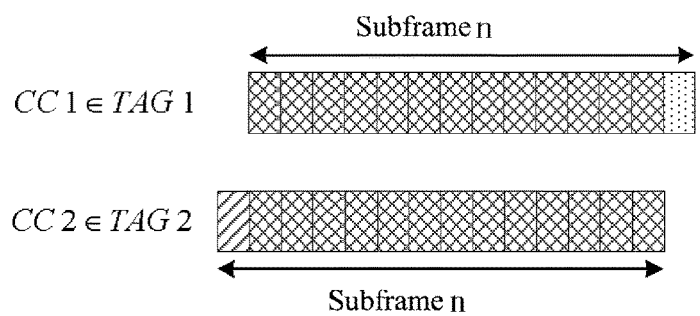
FIG. 20 a schematic diagram of uplink symbols sent in different uplink component carriers being partially overlapped in accordance with embodiments 2'-6, 2'-7 and 2'-8 of the present document.

As shown in FIG. 20, in the subframe n, the CC1 needs to send the PUCCH and the CC2 needs to send the PUSCH. Since the CC1 and the CC2 have different TAs, the PUSCH symbol (labeled as ▦) in the subframe n on the CC1 is partially overlapped with the PUSCH symbol (labeled as ▨) in the sub-frame n on the CC2, and the overlapped symbol is labeled as ▩

If the sum of the transmission power of the PUCCH on the CC1 and the transmission power of the PUSCH on the CC2 exceeds the maximum transmission power configured by the UE, then the eNB notifies the UE via the signaling to equal-ratio reduce the transmission power of the PUCCH on the CC1 and the transmission power of the PUSCH on the CC2; or according to the predefined rule 3, the UE equal-ratio reduces the transmission power of the symbols overlapped in the uplink channels on all the carriers.

the UE equal-ratio reduces the transmission power of the symbols overlapped in the PUCCH on the CC1 and in the PUSCH on the CC2, until the sum of the transmission power of the overlapped symbols in the PUCCH on the CC1 and in the PUSCH on the CC2 is not higher than the maximum transmission power configured by the UE. Then the UE simultaneously sends the PUCCH on the CC1 and the PUSCH on the CC2.

Embodiment 2'-7

As shown in FIG. 20, in the subframe n, the CC1 needs to send the PUCCH and the CC2 needs to send the PUSCH.

Since the CC1 and the CC2 have different TAs, the PUCCH symbol (labeled as ▯) in the subframe n on the CC1 is partially overlapped with the PUSCH symbol (labeled as ▨) in the subframe n on the CC2, and the overlapped symbol is labeled as ▨

If the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the symbols overlapped in the PUSCH on the CC2; or according to the predefined rule 3, the UE reduces the transmission power of the uplink channels on all the carriers according to their priorities.

If the prioritizing method at this time is the abovementioned prioritizing method 1, the priority of the PUCCH on the CC1 is higher than that of the PUSCH on the CC2.

The UE first reduces the transmission power of the symbol overlapped in the PUSCH on the CC2, and then reduces the transmission power of the symbol overlapped in the PUCCH on the CC1, until the sum of the transmission power of the symbol overlapped in the PUCCH on the CC1 and the transmission power of the symbol overlapped in the PUSCH on the CC2 is not higher than the maximum transmission power configured by the UE. Then the UE sends the PUCCH on the CC1 and the PUSCH on the CC2.

Embodiment 2'-8

As shown in FIG. 20, in the subframe n, the CC1 needs to send the PUCCH and the CC2 needs to send the PUSCH. Since the CC1 and the CC2 have different TAs, the PUCCH symbol (labeled as ▯) in the subframe n on the CC1 is partially overlapped with the PUSCH symbol (labeled as ▨) in the subframe n on the CC2, and the overlapped symbol is labeled as ▨

If the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the PUSCH on the CC2 according to their priorities; or according to the predefined rule 3, the UE reduces the transmission power of the symbols overlapped in uplink channels on all the carriers according to their priorities.

If the prioritizing method at this time is the abovementioned prioritizing method 2, the priority of the PUCCH on the CC1 is higher than that of the PUSCH on the CC2.

The UE first reduces the transmission power of the symbol overlapped in the PUSCH on the CC2, and then reduces the transmission power of the symbol overlapped in the PUCCH on the CC1, until the sum of the transmission power of the symbol overlapped in the PUCCH on the CC1 and the transmission power of the symbol overlapped in PUSCH on the CC2 is not higher than the maximum transmission power configured by the UE. Then the UE sends the PUCCH on the CC1 and the PUSCH on the CC2.

Embodiment 2'-9

Figure 21:
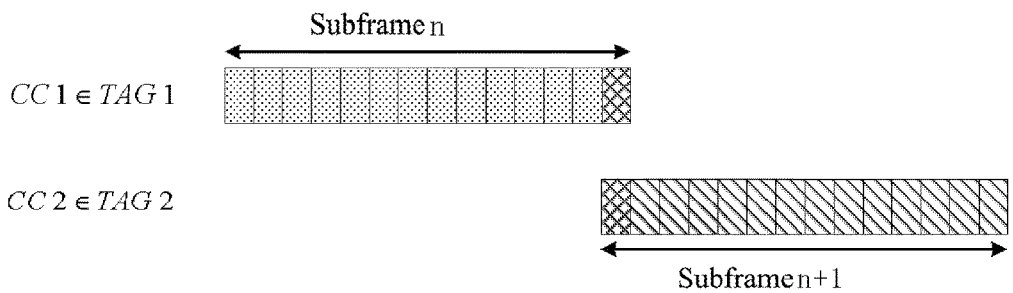
FIG. 21 is a schematic diagram of uplink symbols sent on different uplink component carriers being partially overlapped in accordance with embodiments 2'-9 and 2'-10 of the present document.

As shown in FIG. 21, in the subframe n, the CC1 needs to send the PUCCH, and in the sub-frame n+1, the CC2 needs to send the PUSCH. Since the CC1 and the CC2 have different TAs, the PUCCH symbol (labeled as ▯) in the subframe n on the CC1 is partially overlapped with the PUSCH symbol (labeled as ▨) in the subframe n+1 on the CC2, and the overlapped symbol is labeled as ▨

If the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the symbol overlapped in the PUSCH on the CC2 according to their priorities; or according to the predefined rule 3, the UE reduces the transmission power of the symbols overlapped in the uplink channels on all the carriers according to their priorities.

If the prioritizing method at this time is the abovementioned prioritizing method 4, the priority of the PUCCH on the CC1 in the subframe n is higher than that of the PUSCH on the CC2 in the subframe n+1.

The UE first reduces the transmission power of the symbol overlapped in the PUSCH on the CC2 in the subframe n+1, and then reduces the transmission power of the symbol overlapped in the PUCCH on the CC1 in the subframe n, until the sum of the transmission power of the symbol overlapped in the PUCCH on the CC1 in the subframe n and the transmission power of the symbol overlapped in the PUSCH on the CC2 in the subframe n+1 is not higher than the maximum transmission power configured by the UE. Then the UE sends the PUCCH on the CC1 and the PUSCH on the CC2.

Embodiment 2'-10

As shown in FIG. 21, in the subframe n, the CC1 needs to send the PUCCH, and in the sub-frame n+1, the CC2 needs to send the PUSCH. Since the CC1 and the CC2 have different TAs, the PUCCH symbol (labeled as ▯) in sub-frame n on the CC1 is partially overlapped with the PUSCH symbol (labeled as ▨) in the sub-frame n+1 on the CC2, and the overlapped symbol is labeled as ▨

If at this time, the sum of the transmission power of the PUCCH on the CC1 and the transmission power of the PUSCH on the CC2 exceeds the maximum transmission power configured by the UE, then the eNB notifies the UE via the signaling to reduce the transmission power of the PUCCH on the CC1 and the transmission power of the symbol overlapped in the PUSCH on the CC2 according to their priorities; or according to the predefined rule 3, the UE reduces the transmission power of the symbols overlapped in the uplink channels on all the carriers according to their priorities.

If the prioritizing method at this time is the abovementioned prioritizing method 5, the priority of the PUSCH on the CC2 in the subframe n+1 is higher than that of the PUCCH on the CC1 in the subframe n.

The UE first reduces the transmission power of the symbol overlapped in the PUCCH on the CC1 in the subframe n, and then reduces the transmission power of the symbol overlapped in the PUSCH on the CC1 in the subframe n+1, until the sum of the transmission power of the symbol overlapped in the PUCCH on the CC1 in the subframe n and the transmission power of the symbol overlapped in the PUSCH on the CC2 in the subframe n+1 is not higher than the maximum transmission power configured by the UE. Then the UE sends the PUCCH on the CC1 and the PUSCH on the CC2.

Figure 22:
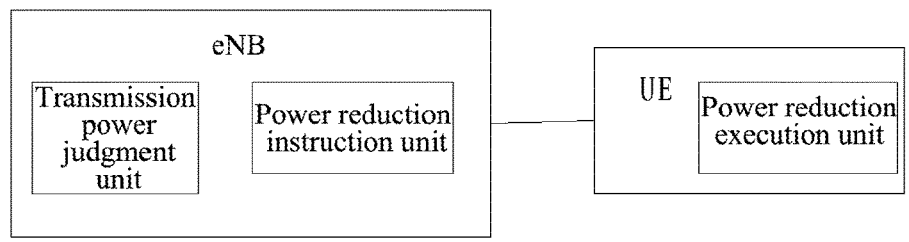
FIG. 22 is a schematic diagram of an uplink signal power reduction apparatus in a carrier aggregation system.

Furthermore, the embodiment of the present document further provides an uplink signal power reduction apparatus in a carrier aggregation system, as shown in FIG. 22, the apparatus mainly comprises a transmission power judgment unit and a power reduction instruction unit in the evolved NodeB, and a power reduction execution unit in the UE, wherein:

said transmission power judgment unit is used to, when the user equipment is configured with multiple timing advances and it is determined that the symbols in uplink channels carried on different carriers are not aligned in the time domain, judge whether the symbols are overlapped on the time domain on different carriers or not, if yes, then judge whether the sum of the transmission power of each uplink channel of the UE exceeds the maximum transmission power configured by said UE or not;

said power reduction instruction device is used to, if said transmission power judgment unit determines that the sum of the transmission power of each uplink channel of said UE exceeds the maximum transmission power configured by the UE, instruct the UE to reduce the transmission power of the uplink channels in which the symbols are overlapped in the time domain on different carriers;

said power reduction execution unit is used to, according to the instructions from the evolved NodeB, reduce the transmission power of the uplink channels in which the symbols are overlapped in the time domain on different carriers.

Furthermore, said power reduction instruction unit is used to instruct predefined rules of said UE for reducing the power;

said power reduction execution unit is used to, in accordance with the predefined rules instructed by the power reduction instruction unit, reduce the transmission power of the uplink channels in which the symbols are overlapped in the time domain on different carriers;

Wherein, said predefined rules comprise: equal-ratio reducing the transmission power of the uplink channels on each uplink carrier, until the transmission power of the UE does not exceed the maximum transmission power configured by the UE; or, according to the low to high order of the priorities of the uplink channels, reducing the power of each uplink channel, until the transmission power of said UE does not exceed the maximum transmission power configured by the UE; or, only reducing the transmission power of the symbols overlapped in different channels.

Furthermore, said power reduction instruction unit is used to instruct the UE the power reduction method and/or the power reduction object;

said power reduction execution unit is used to, in accordance with the power reduction method instructed by the power reduction instruction unit, reduce the transmission power of said power reduction object;

Wherein, said power reduction method comprises: equal-ratio reducing the transmission power of each uplink channel; reducing the transmission power of each uplink channel according to the priorities of the uplink channels in the low to high order; said power reduction object comprises: all uplink channels; designated uplink channels.

Furthermore, the transmission power judgment unit is used to, upon receiving a notification that the UE is in the power limited state, determine that the sum of the transmission power of each uplink channel of said UE exceeds the maximum transmission power configured by the UE.

Furthermore, said power reduction instruction unit is used to, by the physical layer signaling or higher-layer signaling, instruct said UE to reduce the transmission power of the uplink channels in which symbols are overlapped in the time domain on different carriers.

Figure 23:
FIG. 23 is a schematic diagram of an uplink signal power reduction apparatus in a carrier aggregation system.

Furthermore, the embodiment of the present document further provides an uplink signal power reduction apparatus in the carrier aggregation system, as shown in FIG. 23, the apparatus mainly comprises a transmission power judgment module and a transmission power reduction module in the UE, wherein:

Said transmission power judgment module is used to, said UE is configured with multiple timing advances, when the symbols in uplink channels carried on different carriers are not aligned in the time domain, and the symbols on different carriers are overlapped in the time domain, judge whether the sum of the transmission power of each uplink channel of said UE exceeds the maximum transmission power configured for said UE or not;

said transmission power reduction module is used to, if said transmission power judgment module determines that the transmission power of each uplink channel of said UE exceeds the maximum transmission power configured by the UE, reduce the transmission power of the uplink channels in which symbols are overlapped in the time domain on different carriers according to a predefined rule.

Furthermore, said transmission power reduction module is used to, in accordance with the following predefined rules, reduce the transmission power of the uplink channels in which the symbols are overlapped in the time domain on different carriers:

equal-ratio reducing the transmission power of the uplink channels on each uplink carrier, until the transmission power of said UE does not exceed the maximum transmission power configured by the UE; or reducing the power of each uplink channel according to the priorities of the uplink channels in the low to high order, until the transmission power of said UE does not exceed the maximum transmission power configured by the UE; or only reducing the transmission power of the symbols overlapped in different channels.

Furthermore, when said transmission power reduction module only reduces the transmission power of the symbols overlapped in different channels, it equal-ratio reduces the transmission power of the overlapped symbols, or, reduces the power of the symbols that are overlapped in different channels according to the low to high order of the priorities of the uplink channels corresponding to the symbols that are overlapped.

Furthermore, said transmission power reduction module is used to, in accordance with one of the following methods, judge whether the sum of the transmission power of each uplink channel exceeds the maximum transmission power configured by the UE or not:

judging whether the sum of the transmission power of the uplink channels carried on each uplink carrier in the current subframe exceeds the maximum transmission power configured by the UE or not; or judging whether the sum of the transmission power of the uplink channels carried on each uplink carrier in the current subframe and the transmission power of the uplink channels carried on each uplink carrier that the next subframe is ready to send exceeds the maximum transmission power configured by the UE or not.

Those ordinarily skilled in the art can understand that all or some of steps of the above-mentioned method may be completed by the programs instructing the relevant hardware, and said programs may be stored in a computer-readable storage medium, such as read only memory, magnetic or optical disk. Optionally, all or part of the steps of the above-mentioned embodiments may also be implemented by using one or more integrated circuits. Accordingly, each module/unit in the above-mentioned embodiment may be realized in the form of hardware or software function module. The present document is not limited to any specific form of hardware and software combinations.

The above description is only preferred embodiments of the present document, and is not intended to limit the protection scope of the present document. According to the content of the present document, there may be also a variety of other embodiments, and without departing from the spirit and essence of the present document, those skilled in the field can make all kinds of corresponding changes and modifications in accordance with the present document, while within the spirit and principles of the present document, all changes, equivalent replacements and improvements should be included within the scope of the present document.

INDUSTRIAL APPLICABILITY

With the embodiment of the present document, the problem that the prior art does not support the signal transmission when the signal symbols sent on different uplink component carriers are overlapped in the time domain in the carrier aggregation system configured with MTA.

What we claim is:

1. An uplink signal transmitting method applied to a carrier aggregation system, comprising:
    after configuring more than two timing advances, a user equipment (UE), according to predefined rules, transmitting uplink channels and/or uplink signals in which symbols are to be overlapped in a time domain on different carriers after rate-matching processing on the uplink channels and/or uplink signals, or transmitting after discarding said uplink channels and/or uplink signals, or simultaneously transmitting said uplink channels and/or uplink signals; wherein,
    said predefines rules comprise transmitting rules, said transmitting rules comprise:
    when said uplink channels in which symbols are to be overlapped in a time domain on different carriers are same, the UE, according to priorities of said uplink channels, transmitting said uplink channels after rate-matching processing on the uplink channels; transmitting after discarding said uplink channels, or simultaneously transmitting said uplink channels;
    wherein, the priorities of said uplink channels comprise: determining the priorities in accordance to sub-frame index of said uplink channels;
    wherein, the priority in the latter sub-frame is higher than that of in the former sub-frame; or the priority in a former sub-frame is higher than that of in a latter sub-frame.

2. The method of claim 1, wherein,
    said performing rate matching for said uplink channels and/or uplink signals in which symbols are to be overlapped in the time domain on different carriers, comprises,
    for said uplink channels and/or uplink signals in which symbols are to be overlapped in the time domain, emptying one particular symbol in said uplink channels and not sending within said particular symbol; and
    said discarding said uplink channels and/or uplink signals in which symbols are to be overlapped in the time domain on different carriers, comprises,
    discarding uplink channels and/or uplink signals in which said particular symbol is to be overlapped in the time domain, and not transmitting the corresponding uplink channels and/or uplink signals on a discarded symbol.

3. The method of claim 1, wherein,
    said predefined rules further comprise triggering rules, and only said triggering rule being met will said uplink channels and/or uplink signals be processed according to said transmitting rules;
    said triggering rules being at least one of the following rules,
    the difference of timing advance values of different uplink carriers configured by said eNB for said UE exceeding a first preset threshold value; or
    said UE finding out that the difference of the actual sending time of said configured different uplink carriers exceeding a second preset threshold value.

4. The method of claim 1, wherein, said transmitting rules comprise,
    when said uplink channels in which symbols are to be overlapped in the time domain on different carriers are physical uplink shared channels, PUSCHs, said UE selecting any one of the following methods to process,
    method one: said UE simultaneously transmitting said PUSCHs on different carriers;
    method two: said UE discarding the PUSCH with lower priority and transmitting the PUSCH with higher priority according to certain priorities; in the case that the PUSCHs with the same priority have symbols to be overlapped in the time domain, said UE simultaneously transmitting said PUSCHs with the same priority;
    method three: according to said certain priority rule, said UE emptying symbols in the PUSCHs with lower priority that are overlapped with the symbols in the PUSCHs with higher priority, and then transmitting the PUSCHs on different carriers; when the symbols in said PUSCHs with the same priority are to be overlapped in the time domain, said UE simultaneously transmitting said PUSCHs with the same priority.

5. The method of claim 4, wherein, the priorities of said uplink channels further comprise at least one of the following priorities,
    determining the priorities in accordance to whether the uplink control information, UCI, is carried or not, wherein: the priority of the PUSCHs carrying UCI is higher than that of the PUSCHs not carrying UCI;
    determining the priorities in accordance to the carriers carrying the PUSCH, wherein, the priority of the PUSCHs in the PCell is higher than that of the PUSCHs in the SCell;
    determining the priorities in accordance with whether there is newly transmitted data or not, wherein: the priority of the PUSCHs with newly transmitted data is higher than that of the PUSCHs carrying the retransmitted data.

6. An uplink signal transmitting method applied to a carrier aggregation system, comprising:
    after configuring more than two timing advances, a user equipment (UE), according to predefined rules, transmitting at least one of uplink channels and uplink signals in which symbols are to be overlapped in a time domain on different carriers;
    wherein, said predefined rules comprise triggering rules and transmitting rules, and said at least one of said uplink channels and uplink signals being processed according to said transmitting rules only when at least one of the triggering rules is met; wherein when one of the triggering rules is the difference of timing advance values of different uplink carriers configured by said eNB for said UE exceeding a first preset threshold value, transmitting at least one of uplink channels and uplink signals in which symbols are to be overlapped in a time domain on different carriers after rate-matching processing on at least one of the uplink channels and uplink signals;

when one of the trigger rules is said UE finding out that the difference of the actual transmitting time of said configured different uplink carriers exceeding a second preset threshold value, transmitting at least one of uplink channels and uplink signals in which symbols are to be overlapped in a time domain on different carriers after discarding at least one of said uplink channels and uplink signals;

wherein, said transmitting rules comprise: when said uplink channels and/or uplink data in which symbols are to be overlapped in a time domain on different carriers are same or different, the UE, transmitting said same or different uplink channels and/or uplink data after rate-matching processing on same or different uplink channels and/or uplink data; transmitting after discarding same or different uplink channels and/or uplink data, or simultaneously transmitting same or different uplink channels and/or uplink data;

wherein, when said uplink channels in which symbols are to be overlapped in a time domain on different carriers are PUSCHs, the UE, according to priorities of sub-frame index of said uplink channels, transmitting said uplink channels;

when said uplink channels in which symbols are to be overlapped in a time domain on different carriers are PUSCH and PUCCH, the UE, according to priorities of said uplink channels; transmitting said uplink channels;

when said uplink channels and/or uplink data are PUCCH, PUCCH and/or SRS, the UE, transmitting said uplink channels and/or uplink data after discarding said uplink channels and/or uplink data, or simultaneously transmitting said uplink channels and/or uplink data.

7. The method of claim 6, wherein, said performing rate matching for said uplink channels and/or uplink signals in which symbols are to be overlapped in the time domain on different carriers, comprises, for said uplink channels and/or uplink signals in which symbols are to be overlapped in the time domain, emptying one particular symbol in said uplink channels and not sending within said particular symbol; and said discarding said uplink channels and/or uplink signals in which symbols are to be overlapped in the time domain on different carriers, comprises, discarding uplink channels and/or uplink signals in which said particular symbol is to be overlapped in the time domain, and not transmitting the corresponding uplink channels and/or uplink signals on a discarded symbol.

8. The method of claim 6, wherein, said transmitting rules comprise, when said uplink channels in which symbols are to be overlapped in the time domain on different carriers are physical uplink shared channels, PUSCHs, said UE selecting any one of the following methods to process:

method one: said UE simultaneously transmitting said PUSCHs on different carriers;

method two: said UE discarding the PUSCH with lower priority and transmitting the PUSCH with higher priority according to certain priorities; in the case that the PUSCHs with the same priority have symbols to be overlapped in the time domain, said UE simultaneously transmitting said PUSCHs with the same priority;

method three: according to said certain priority rule, said UE emptying symbols in the PUSCHs with lower priority that are overlapped with the symbols in the PUSCHs with higher priority, and then transmitting the PUSCHs on different carriers; when the symbols in said PUSCHs with the same priority are to be overlapped in the time domain, said UE simultaneously transmitting said PUSCHs with the same priority;

wherein, when said symbols in the PUSCHs and the PUCCHs are to be overlapped in the time domain on more than two different carriers, after processing all said PUSCHs overlapped with said PUCCHs according to the method three, when there are still symbols overlapped in the time domain in said more than two PUSCHs, selecting any one of the following methods to process said more than two PUSCHs:

method one: said UE simultaneously transmitting said PUSCHs on said different carriers;

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on different carriers; when the symbols are to be overlapped in the time domain in the PUSCH with the same priority, said UE simultaneously transmitting the PUSCHs with the same priority.

9. The method of claim 6, wherein, said transmitting rules comprise:

when said uplink channels in which symbols are to be overlapped in the time domain on different carriers are PUSCHs and physical uplink control channels PUCCHs, said UE selecting any one of the following methods to process, method one: said UE simultaneously transmitting said PUSCHs and PUCCHs on said different carriers;

method two: said UE discarding said PUSCHs and only transmitting said PUCCHs;

method three: said UE rate matching said PUSCHs, emptying the symbols in the PUSCHs that are to be overlapped with the symbols in the PUCCHs, and transmitting the PUCCHs and PUSCHs on different carriers;

wherein, when said symbols in the PUSCHs and the PUCCHs are to be overlapped in the time domain on more than two different carriers, after processing all said PUSCHs overlapped with said PUCCHs according to the method three, when there are still symbols overlapped in the time domain in said more than two PUSCHs, selecting any one of the following methods to process said more than two PUSCHs, method one: said UE simultaneously transmitting said PUSCHs on said different carriers;

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on different carriers; when the symbols are to be overlapped in the time domain in the PUSCH with the same priority, said UE simultaneously transmitting the PUSCHs with the same priority.

10. The method of claim 6, wherein, said transmitting rules comprise:

when said uplink channels in which symbols are overlapped in the time domain on different carriers are PUSCHs and sounding reference signals (SRSs), said UE selecting any one of the following methods to process, method one: said UE simultaneously transmitting the PUSCHs and SRSs on different carriers;

method two: said UE discarding said SRSs, and only transmitting said PUSCHs;

method three: said UE discarding said PUSCHs, and only transmitting said SRSs;

method four: said UE emptying the symbols in said PUSCHs that are overlapped with said SRSs, and then transmitting said PUSCHs and SRSs on different carriers; wherein, when PUSCHs on more than two different carriers and SRSs on more than two different carriers have symbols to be overlapped in the time domain, after processing all the overlapped SRSs and PUSCHs according to the method four, when there are still symbols in said more than two PUSCHs being overlapped in the time domain, selecting any one of the following methods to process said more than two PUSCHs, method one: said UE simultaneously transmitting said PUSCHs on different carriers:

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on said different carriers; when the symbols are to be overlapped in the time domain in the PUSCH with the same priority, said UE simultaneously transmitting the PUSCHs with the same priority;

or;

wherein, said transmitting rules comprise, when said uplink channels in which symbols are to be overlapped in the time domain on different carriers are PUCCHs and SRSs, said UE selecting any one of the following methods to process:

method one: said UE simultaneously transmitting said PUCCHs and SRSs on different carriers;

method two: said UE discarding said SRSs, and only transmitting said PUCCHs;

wherein, said transmitting rules comprise:

when the symbols in said PUCCHs and SRSs are overlapped in the time domain on multiple different carriers, said UE selecting any one of the following methods to process:

method one: said UE simultaneously transmitting said PUCCHs and SRSs on multiple different carriers;

method two: said UE discarding all SRSs and only transmitting said PUCCHs;

method three: said UE discarding all the periodic SRS in which symbols are to be overlapped, and simultaneously transmitting all the aperiodic SRSs and PUCCHs in which symbols are to be overlapped.

11. A user equipment applied to a carrier aggregation system, comprising:

a receiving module, configured to receive more than two timing advances configured by an evolved NodeB;

a transmitting module, configured to transmit after performing rate matching for the uplink channels and/or uplink signals in which symbols are overlapped in the time domain on different carriers, or to transmit the uplink channels and/or uplink signals after discarding, or to simultaneously transmit said uplink channels and/or uplink signals according to predetermined rules sent from the NodeB; wherein, said predefines rules comprise transmitting rules, said transmitting module is further configured to:

said transmitting rules comprising: when said uplink channels in which symbols are to be overlapped in a time domain on different carriers are same, the UE, according to priorities of said uplink channels, transmitting said uplink channels after rate-matching processing on the uplink channels; transmitting after discarding said uplink channels, or simultaneously transmitting said uplink channels;

wherein, the priorities of said uplink channels comprise: the priorities determined by sub-frame index of said uplink channels;

wherein, the priority in the latter sub-frame is higher than that of in the former sub-frame; or the priority in a former sub-frame is higher than that of in a latter sub-frame.

12. The user equipment of claim 11, wherein, the transmitting module is configured to:

said performing rate matching for said uplink channels and/or uplink signals in which symbols are to be overlapped in the time domain on different carriers, comprising:

for said uplink channels and/or uplink signals in which symbols are to be overlapped in the time domain, emptying one particular symbol in said uplink channels and not sending within said particular symbol; and said discarding said uplink channels and/or uplink signals in which symbols are to be overlapped in the time domain on different carriers, comprising:

discarding uplink channels and/or uplink signals in which said particular symbol is to be overlapped in the time domain, and not transmitting the corresponding uplink channels and/or uplink signals on a discarded symbol.

13. The user equipment of claim 11, wherein, said predefined rules further comprise triggering rules, and only said triggering rule being met will said uplink channels and/or uplink signals be processed according to said transmitting rules;

said triggering rules being at least one of the following rules, the difference of timing advance values of different uplink carriers configured by said eNB for said UE exceeding a first preset threshold value; or said UE finding out that the difference of the actual sending time of said configured different uplink carriers exceeding a second preset threshold value.

14. The user equipment of any one of claim 11, wherein, said transmitting module is configured to, said transmitting rules comprising, when said uplink channels in which symbols are to be overlapped in the time domain on different carriers are physical uplink shared channels, PUSCHs, said UE selecting any one of the following methods to process, method one: said UE simultaneously transmitting said PUSCHs on different carriers;

method two: said UE discarding the PUSCH with lower priority and transmitting the PUSCH with higher priority according to certain priorities; in the case that the PUSCHs with the same priority have symbols to be overlapped in the time domain, said UE simultaneously transmitting said PUSCHs with the same priority;

method three: according to said certain priority rule, said UE emptying symbols in the PUSCHs with lower priority that are overlapped with the symbols in the PUSCHs with higher priority, and then transmitting the PUSCHs on different carriers; when the symbols in said PUSCHs with the same priority are to be overlapped in the time domain, said UE simultaneously transmitting said PUSCHs with the same priority.

15. The user equipment of claim 14, wherein, the priorities of said uplink channels further comprise at least one of the following priorities, determining the priorities in accordance to whether the uplink control information, UCI, is carried or not, wherein: the priority of the PUSCHs carrying UCI is higher than that of the PUSCHs not carrying UCI;

determining the priorities in accordance to the carriers carrying the PUSCH, wherein, the priority of the PUSCHs in the PCell is higher than that of the PUSCHs in the SCell;

determining the priorities in accordance with whether there is newly sent data or not, wherein: the priority of the PUSCHs with newly sent data is higher than that of the PUSCHs carrying the resent data.

16. A user equipment applied to a carrier aggregation system, comprising:

a receiving module, configured to receive more than two timing advances configured by an evolved NodeB;

a transmitting module, configured to transmit after performing rate matching for the uplink channels and/or uplink signals in which symbols are overlapped in the time domain on different carriers, or to transmit the uplink channels and/or uplink signals after discarding, or to simultaneously transmit said uplink channels and/or uplink signals according to predetermined rules sent from the NodeB;

wherein, said predefined rules comprise triggering rules and transmitting rules, and said at least one of said uplink channels and uplink signals being processed according to said transmitting rules only when at least one of the triggering rules is met; wherein, when one of the triggering rules is the difference of timing advance values of different uplink carriers configured by said eNB for said UE exceeding a first preset threshold value, transmitting at least one of uplink channels and uplink signals in which symbols are to be overlapped in a time domain on different carriers after rate-matching processing on at least one of the uplink channels and uplink signals;

when one of the trigger rules is said UE finding out that the difference of the actual transmitting time of said configured different uplink carriers exceeding a second preset threshold value, transmitting at least one of uplink channels and uplink signals in which symbols are to be overlapped in a time domain on different carriers after discarding at least one of said uplink channels and uplink signals;

wherein, said transmitting module is configured to, said transmitting rules comprising: when said uplink channels and/or uplink data in which symbols are to be overlapped in a time domain on different carriers are same or different, the UE, transmitting said same or different uplink channels and/or uplink data after rate-matching processing on same or different uplink channels and/or uplink data; transmitting after discarding same or different uplink channels and/or uplink data, or simultaneously transmitting same or different uplink channels and/or uplink data;

wherein, when said uplink channels in which symbols are to be overlapped in a time domain on different carriers are PUSCHs, the UE, according to priorities of subframe index, transmitting said uplink channels;

when said uplink channels in which symbols are to be overlapped in a time domain on different carriers are PUSCH and PUCCH, the UE, according to priorities of said uplink channels; transmitting said uplink channels;

when said uplink channels and/or uplink data are PUCCH, PUCCH and/or SRS, the UE, transmitting said uplink channels and/or uplink data after discarding said uplink channels and/or uplink data, or simultaneously transmitting said uplink channels and/or uplink data.

17. The user equipment of claim 16, wherein, said transmitting module is configured to, said performing rate matching for said uplink channels and/or uplink signals in which symbols are to be overlapped in the time domain on different carriers, comprising:

for said uplink channels and/or uplink signals in which symbols are to be overlapped in the time domain, emptying one particular symbol in said uplink channels and not sending within said particular symbol; and said discarding said uplink channels and/or uplink signals in which symbols are to be overlapped in the time domain on different carriers, comprising:

discarding uplink channels and/or uplink signals in which said particular symbol is to be overlapped in the time domain, and not transmitting the corresponding uplink channels and/or uplink signals on a discarded symbol.

18. The user equipment of claim 16, wherein, said transmitting module is configured to:

said transmitting rules comprising, when said uplink channels in which symbols are to be overlapped in the time domain on different carriers are physical uplink shared channels, PUSCHs, said UE selecting any one of the following methods to process, method one: said UE simultaneously transmitting said PUSCHs on different carriers;

method two: said UE discarding the PUSCH with lower priority and transmitting the PUSCH with higher priority according to certain priorities; in the case that the PUSCHs with the same priority have symbols to be overlapped in the time domain, said UE simultaneously transmitting said PUSCHs with the same priority;

method three: according to said certain priority rule, said UE emptying symbols in the PUSCHs with lower priority that are overlapped with the symbols in the PUSCHs with higher priority, and then transmitting the PUSCHs on different carriers; when the symbols in said PUSCHs with the same priority are to be overlapped in the time domain, said UE simultaneously transmitting said PUSCHs with the same priority;

wherein, when said symbols in the PUSCHs and the PUCCHs are to be overlapped in the time domain on more than two different carriers, after processing all said PUSCHs overlapped with said PUCCHs according to the method three, when there are still symbols overlapped in the time domain in said more than two PUSCHs, selecting any one of the following methods to process said more than two PUSCHs:

method one: said UE simultaneously transmitting said PUSCHs on said different carriers;

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on different carriers; when the symbols are to be overlapped in the time domain in the PUSCH with the same priority, said UE simultaneously transmitting the PUSCHs with the same priority.

19. The user equipment of claim 16, wherein, said transmitting module is configured to, said transmitting rules comprising, when said uplink channels in which symbols are to be overlapped in the time domain on different carriers are PUSCHs and physical uplink control channels PUCCHs, said UE selecting any one of the following methods to process, method one: said UE simultaneously transmitting said PUSCHs and PUCCHs on said different carriers;

method two: said UE discarding said PUSCHs and only transmitting said PUCCHs;

method three: said UE rate matching said PUSCHs, emptying the symbols in the PUSCHs that are to be overlapped with the symbols in the PUCCHs, and transmitting the PUCCHs and PUSCHs on different carriers;

wherein, when said symbols in the PUSCHs and the PUCCHs are to be overlapped in the time domain on more than two different carriers, after processing all said PUSCHs overlapped with said PUCCHs according to the method three, when there are still symbols overlapped in the time domain in said more than two PUSCHs, selecting any one of the following methods to process said more than two PUSCHs:

method one: said UE simultaneously transmitting said PUSCHs on said different carriers;

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on different carriers; when the symbols are to be overlapped in the time domain in the PUSCH with the same priority, said UE simultaneously transmitting the PUSCHs with the same priority.

20. The user equipment of claim 16, wherein, said transmitting module is configured to, said transmitting rules comprising, when said uplink channels in which symbols are overlapped in the time domain on different carriers are PUSCHs and sounding reference signals (SRSs), said UE selecting any one of the following methods to process, method one: said UE simultaneously transmitting the PUSCHs and SRSs on different carriers;

method two: said UE discarding said SRSs, and only transmitting said PUSCHs;

method three: said UE discarding said PUSCHs, and only transmitting said SRSs;

method four: said UE emptying the symbols in said PUSCHs that are overlapped with said SRSs, and then transmitting said PUSCHs and SRSs on different carriers; wherein, when PUSCHs on more than two different carriers and SRSs on more than two different carriers have symbols to be overlapped in the time domain, after processing all the overlapped SRSs and PUSCHs according to the method four, when there are still symbols in said more than two PUSCHs being overlapped in the time domain, selecting any one of the following methods to process said more than two PUSCHs:

method one: said UE simultaneously transmitting said PUSCHs on different carriers:

method two: said UE discarding the PUSCHs with lower priority and transmitting the PUSCHs with higher priority according to certain priorities; when PUSCHs with the same priority have symbols to be overlapped in the time domain, said UE simultaneously transmitting said PUSCHs with the same priority;

method three: according to certain priorities, said UE emptying the symbols in the PUSCHs with lower priority that are overlapped with the symbols in the PUSCHs with higher priority, and then transmitting the PUSCHs on said different carriers; when the symbols are to be overlapped in the time domain in the PUSCH with the same priority, said UE simultaneously transmitting the PUSCHs with the same priority;

or;

wherein, said transmitting rules comprising, when said uplink channels in which symbols are to be overlapped in the time domain on different carriers are PUCCHs and SRSs, said UE selecting any one of the following methods to process:

method one: said UE simultaneously transmitting said PUCCHs and SRSs on different carriers;

method two: said UE discarding said SRSs, and only transmitting said PUCCHs;

wherein, said transmitting rules comprising:

when the symbols in said PUCCHs and SRSs are overlapped in the time domain on multiple different carriers, said UE selecting any one of the following methods to process:

method one: said UE simultaneously transmitting said PUCCHs and SRSs on multiple different carriers;

method two: said UE discarding all SRSs and only transmitting said PUCCHs;

method three: said UE discarding all the periodic SRS in which symbols are to be overlapped, and simultaneously transmitting all the aperiodic SRSs and PUCCHs in which symbols are to be overlapped.

* * * * *